(12) United States Patent
Kanemaki et al.

(10) Patent No.: US 6,229,820 B1
(45) Date of Patent: May 8, 2001

(54) NETWORK SYSTEM AND SWITCHING UNIT

(75) Inventors: Hideyasu Kanemaki; Satoshi Fudatate; Eitarou Hiraga; Minoru Yamaguchi; Toshikatsu Atarashi, all of Takatsu-ku (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/036,872

(22) Filed: Mar. 9, 1998

(30) Foreign Application Priority Data

Sep. 9, 1997 (JP) .................................................. 9-244349

(51) Int. Cl.[7] ................................. H04J 3/22; H04J 3/18
(52) U.S. Cl. ............................................. 370/468; 370/477
(58) Field of Search ..................................... 370/235, 248, 370/357, 360, 400, 420, 395, 396, 468, 477

(56) References Cited

U.S. PATENT DOCUMENTS

| | | | |
|---|---|---|---|
| 5,282,202 | * | 1/1994 | Bernstein et al. ................... 370/94.1 |
| 5,444,699 | * | 8/1995 | Watanabe ................................ 370/54 |
| 5,535,199 | * | 7/1996 | Amri et al. ............................. 370/60 |
| 5,671,216 | * | 9/1997 | Subasingha et al. ................. 370/230 |
| 5,673,253 | * | 9/1997 | Shaffer .................................. 370/229 |
| 5,825,779 | * | 10/1998 | Putnins et al. ....................... 370/477 |
| 5,943,337 | * | 8/1999 | Sasagawa ............................. 370/395 |
| 6,028,840 | * | 2/2000 | Worster ................................ 370/230 |

FOREIGN PATENT DOCUMENTS 6276295  9/1994  (JP) .
8340336  12/1996 (JP) .

* cited by examiner

*Primary Examiner*—Alpus H. Hsu
*Assistant Examiner*—Duc Ho
(74) *Attorney, Agent, or Firm*—Helfgott & Karas, P.C.

(57) ABSTRACT

A network system of the present invention is constructed of first to third terminal equipments connected to a network. In the case of establishing such a plurality of connection calls that a plurality of connections belong to one call between the first and second terminal equipments, if unable to set all the connections between the first and second terminal equipments, the network sets the connections capable of ensuring bandwidths between the first and second terminal equipments, and sets a remaining connection between the first and third terminal equipments.

10 Claims, 38 Drawing Sheets

FIG. 9

```
CONNECTION REQUEST MESSAGE
VPI:aa  VCI:ba  REQUEST BANDWIDTH:10Mbps  (IMAGE) ⎫
VPI:ab  VCI:bb  REQUEST BANDWIDTH:64Kbps  (TEXT)  ⎬ CALL-OUT DTE: DTE 10
VPI:ac  VCI:bc  REQUEST BANDWIDTH: 1Mbps  (VOICE) ⎭ CALL-IN  DTE: DTE 20
```

| CALL-OUT SIDE | | CALL-IN SIDE | | CALL-OUT DTE ADDRESS | CALL-IN DTE ADDRESS | REQUEST BANDWIDTH | MULTIMEDIA CALL ID |
|---|---|---|---|---|---|---|---|
| VPI | VCI | VPI | VCI | | | | |
| | | | | | | | |

~18

| | CALL-OUT SIDE | | CALL-IN SIDE | | CALL-OUT DTE ADDRESS | CALL-IN DTE ADDRESS | REQUEST BANDWIDTH | MULTIMEDIA CALL ID |
|---|---|---|---|---|---|---|---|---|
| | VPI | VCI | VPI | VCI | | | | |
| (IMAGE) | aa | ba | | | DTE10 | DTE20 | 10Mbps | 0001 |
| (TEXT) | ab | bb | | | DTE10 | DTE20 | 64Kbps | 0001 |
| (VOICE) | ac | bc | | | DTE10 | DTE20 | 1Mbps | 0001 |

```
CONNECTION REQUEST MESSAGE
VPI:aa  VCI:ba  REQUEST BANDWIDTH  :10Mbps  ID:0001  (IMAGE)
VPI:ab  VCI:bb  REQUEST BANDWIDTH  :64Kbps  ID:0001  (TEXT)   } CALL-OUT DTE: DTE 10
VPI:ac  VCI:bc  REQUEST BANDWIDTH  : 1Mbps  ID:0001  (VOICE)    CALL-IN  DTE: DTE 20
```

FIG. 14

| CALL-OUT SIDE | | CALL-IN SIDE | | CALL-OUT DTE ADDRESS | CALL-IN DTE ADDRESS | REQUEST BANDWIDTH | MULTIMEDIA CALL ID |
|---|---|---|---|---|---|---|---|
| VPI | VCI | VPI | VCI | | | | |
| | | | | | | | |

⇓

| CALL-OUT SIDE | | CALL-IN SIDE | | CALL-OUT DTE ADDRESS | CALL-IN DTE ADDRESS | REQUEST BANDWIDTH | MULTIMEDIA CALL ID |
|---|---|---|---|---|---|---|---|
| VPI | VCI | VPI | VCI | | | | |
| aa | ba | xa | ya | DTE10 | DTE20 | 10Mbps | 0001 |
| ab | bb | xb | yb | DTE10 | DTE20 | 64Kbps | 0001 |

FIG. 15

```
CONNECTION REQUEST MESSAGE
VPI:xa  VCI:ya  REQUEST BANDWIDTH:10Mbps  (IMAGE)      ⎫ CALL-OUT DTE: DTE 10
VPI:xb  VCI:yb  REQUEST BANDWIDTH:64Kbps  (TEXT)(N)    ⎭ CALL-IN  DTE: DTE 20
```

FIG. 16

```
COMPLETION-OF-CONNECTION MESSAGE
VPI:xa  VCI:ya  REQUEST BANDWIDTH:10Mbps  (IMAGE)  }  CALL-PUT DTE: DTE 10
VPI:xb  VCI:yb  REQUEST BANDWIDTH:64Kbps  (TEXT)       CALL-IN DTE: DTE 20
```

FIG. 17

| ACCOMMODATION TERMINAL | TRANSFER DESTINATION DTE |
|---|---|
| DTE20 ⋮ | DTE30 ⋮ |

FIG. 18

SUBSTITUTE CONNECTION SETTING REQUEST MESSAGE
VPI:ac VCI:bc REQUEST BANDWIDTH: 1Mbps ID:0001 (VOICE) CALL-OUT DTE: DTE 10
CALL-IN DTE: DTE 30

FIG. 19

| COMPLETION-OF-CONNECTION MESSAGE | | | | |
|---|---|---|---|---|
| VPI:xa VCI:ya | REQUEST BANDWIDTH:10Mbps | ID:0001 | (IMAGE) | CONNECTED | CALL-IN DTE: DTE 20 |
| VPI:xb VCI:yb | REQUEST BANDWIDTH:64Kbps | ID:0001 | (TEXT) | CONNECTED | CALL-IN DTE: DTE 20 | CALL-OUT DTE: DTE 10 |
| | REQUEST BANDWIDTH: 1Mbps | ID:0001 | (VOICE) | PROCESS OF BEING SET | |

| CALL-OUT SIDE | | CALL-IN SIDE | | CALL-OUT DTE ADDRESS | CALL-IN DTE ADDRESS | REQUEST BANDWIDTH | MULTIMEDIA CALL ID | |
|---|---|---|---|---|---|---|---|---|
| VPI | VCI | VPI | VCI | | | | | |
| aa | ba | | | DTE10 | DTE20 | 10Mbps | 0001 | ~18 |
| ab | bb | | | DTE10 | DTE20 | 64Kbps | 0001 | |
| ac | bc | | | DTE10 | DTE20 | 1Mbps | 0001 | |

| CALL-OUT SIDE | | CALL-IN SIDE | | CALL-OUT DTE ADDRESS | CALL-IN DTE ADDRESS | REQUEST BANDWIDTH | MULTIMEDIA CALL ID | |
|---|---|---|---|---|---|---|---|---|
| VPI | VCI | VPI | VCI | | | | | |
| aa | ba | xa | ya | DTE10 | DTE20 | 10Mbps | 0001 | ~18 |
| ab | bb | xb | yb | DTE10 | DTE20 | 64Kbps | 0001 | |
| ac | bc | | | DTE10 | | 1Mbps | 0001 | |

| CALL-OUT SIDE | | CALL-IN SIDE | | CALL-OUT DTE ADDRESS | CALL-IN DTE ADDRESS | REQUEST BANDWIDTH | MULTIMEDIA CALL ID | ~18 |
|---|---|---|---|---|---|---|---|---|
| VPI | VCI | VPI | VCI | | | | | |
|  |  |  |  |  |  |  |  | |

| CALL-OUT SIDE | | CALL-IN SIDE | | CALL-OUT DTE ADDRESS | CALL-IN DTE ADDRESS | REQUEST BANDWIDTH | MULTIMEDIA CALL ID | ~18 |
|---|---|---|---|---|---|---|---|---|
| VPI | VCI | VPI | VCI | | | | | |
| ac | bc | mc | nc | DTE10 | DTE30 | 1Mbps | 0001 | |

FIG. 23

```
CONNECTION REQUEST MESSAGE
VPI:mc  VCI:nc  REQUEST BANDWIDTH :1Mbps (VOICE)  CALL-OUT DTE: DTE 10
                                                  CALL-IN DTE:  DTE 30
```

FIG. 24

```
COMPLETION-OF-CONNECTION MESSAGE
VPI:mc  VCI:nc  REQUEST BANDWIDTH:1Mbps  (VOICE)  CALL-OUT DTE: DTE 10
                                                  CALL-IN  DTE: DTE 30
```

FIG. 25

```
COMPLETION-OF-CONNECTION MESSAGE
VPI:mc  VCI:nc  REQUEST BANDWIDTH :1Mbps  ID:0001 (VOICE)  CALL-OUT DTE: DTE 10
                                                           CALL-IN  DTE: DTE 30
```

| CALL-OUT SIDE | | CALL-IN SIDE | | CALL-OUT DTE ADDRESS | CALL-IN DTE ADDRESS | REQUEST BANDWIDTH | MULTIMEDIA CALL ID |
|---|---|---|---|---|---|---|---|
| VPI | VCI | VPI | VCI | | | | |
| aa | ba | xa | ya | DTE10 | DTE20 | 10Mbps | 0001 |
| ab | bb | xb | yb | DTE10 | DTE20 | 64Kbps | 0001 |
| ac | bc | | | DTE10 | | 1Mbps | 0001 |

~18

| CALL-OUT SIDE | | CALL-IN SIDE | | CALL-OUT DTE ADDRESS | CALL-IN DTE ADDRESS | REQUEST BANDWIDTH | MULTIMEDIA CALL ID |
|---|---|---|---|---|---|---|---|
| VPI | VCI | VPI | VCI | | | | |
| aa | ba | xa | ya | DTE10 | DTE20 | 10Mbps | 0001 |
| ab | bb | xb | yb | DTE10 | DTE20 | 64Kbps | 0001 |
| ac | bc | mc | nc | DTE10 | DTE20 | 1Mbps | 0001 |

```
COMPLETION-OF-CONNECTION MESSAGE
VPI:aa  VCI:ba  REQUEST BANDWIDTH :10Mbps  (IMAGE) ⎫
VPI:ab  VCI:bb  REQUEST BANDWIDTH :64Kbps  (TEXT)  ⎬ CALL-OUT DTE: DTE 10
VPI:ac  VCI:bc  REQUEST BANDWIDTH : 1Mbps  (VOICE) ⎭ CALL-IN DTE:  DTE 20
```

FIG. 35

(a)
```
DATA OF CONNECTION REQUEST MESSAGE SENT BY NODE B:
CONNECTION REQUEST MESSAGE
VPI:xa VCI:ya  REQUEST BANDWIDTH:10Mbps(IMAGE)  CALL-OUT DTE:DTEa  CALL-IN DTE: DTEb
VPI:xb VCI:yb  REQUEST BANDWIDTH:64kbps(TEXT)            SUBSTITUTE DTE ADDRESS = ?
```

(b)
```
COMPLETION-OF-CONNECTION MESSAGE
VPI:xa VCI:ya  REQUEST BANDWIDTH:10Mbps(IMAGE)  CALL-OUT DTE: DTEa  CALL-IN DTE: DTEb
VPI:xb VCI:yb  REQUEST BANDWIDTH:64kbps(TEXT)            SUBSTITUTE DTE ADDRESS = DTEc
```

(c)
```
SUBSTITUTE CONNECTION SETTING REQUEST MESSAGE    CALL-OUT DTE:DTEa
VPI:ac VCI:bc  REQUEST BANDWIDTH:1Mbps ID:0001 (VOICE)   CALL-IN DTE: DTEb
```

NETWORK SYSTEM AND SWITCHING UNIT

BACKGROUND OF THE INVENTION

The present invention relates to a network system capable of setting at one time a plurality of connections for one call, and to a switching unit.

The multimedia services of an HDTV (High Definition TV) etc consist of a plurality of media elements such as images, voices an texts etc. In the case of transmitting the multimedia services via an ATM (Asynchronous Transfer Mode) network, QOSs (Qualities of Services) required of the respective media elements is different per media element.

In view of this point, in the instance given above, a setting way is not that one connection for transmitting all the media elements is set, but that a connection is set for every media element. If done in this way, each of the medial elements can be transferred. in accordance with a nature (of e.g., whether or not data are transferred burstwise, etc) of each medial element. Therefore, the ITU-T is examining a communication method of setting the connection for every media element. According to this communication method, there is set one call for which to set a plurality of connections. This call is known as a "plurality-of-connection call".

Incidentally, the plurality-of-connection call set in the ATM network is established only when all of the QOSs of the respective connections are satisfied between call-out a DTE (Data Terminal Equipment) of the multimedia service and a call-in DTE of the data. FIG. 37 (a) is an explanatory diagram showing an example in which the plurality-of-connection call is not established in a network system. FIG. 37 (b) is an explanatory diagram showing an example where the plurality-of-connection call is established in a network system.

FIG. 37 (a) and FIG. 37 (b) show an example of the network system in which data about, e.g., movies as a multimedia service are transferred from a call-out DTE 1 via ATM switching units (ATM-SWs) 3 and 4 to a call-in DTE 2. In this example, the movie data consist of media elements such as image data, voice data and text (subtitles) data.

In this example, when the movie data is transmitted by the call-out DTE 1 to the ATM-SW 3, the requests to satisfy the QOSs(which are, e.g., ensuring of a bandwidth, a cell arrival interval, or a delay time of a data transfer etc) of respective pieces of the data give to the ATM-SWs 3 and 4. In response thereto, the ATM-SWs 3 and 4, as shown in FIG. 37(a), satisfy the QOSs relative to, e.g., the image data and the voice data but do not satisfy the QOS relative to the text data. In this case, the ATM-SWs 3 and 4 execute a call disconnecting process even if possible of establishing the connections regarding the image data and the voice data. Accordingly, the plurality-of-connection call is not established between the DTE 1 and the DTE 2.

By contrast, as shown in FIG. 37 (b), the ATM-SWs 3 and 4 satisfy the QOSs relative to the image data, the voice data and the text data, in which case the connections for transmitting each of the data is set between the DTEs 1 and 2. The plurality-of-connection call is thereby established between the DTEs 1 and 2, and the movie data are transmitted to the call-in DTE 2 from the call-out DTE 1.

Thus, the establishment of the plurality-of-connection call requires establishing all the connections for transmitting the respective media elements. This being the case, the applicant of the present application made an application of an ATM-SW (Japanese Patent Application No. 5-180540: hereinafter referred to as the "preceding application") for obviating the above problem prior to filing the present application. FIG. 38 is an explanatory diagram illustrating the ATM-SW relative to the preceding application.

FIG. 38 shows a network system using the ATM-SW concerning the preceding application. Then, there is given an illustration of how the image data and the voice data are transferred from a DTE 5 to a DTE 6. Referring to FIG. 38, in the case of establishing the plurality-of-connection call for transmitting the image data and the voice data between, e.g., the DTE 5 and the DTE 6, an ATM-SW 8 and an ATM-SW 9 establish the respective connections along a route I on which the data are transmitted in a sequence such as DTE 6→ATM-SW 9→ATM-SW 8→DTE 5.

At this time, if the QOS needed for transmitting the voice data on, e.g., the route I is not satisfied (if the connection for transmitting, e.g., the voice data is not established on the route I due to a deficiency of bandwidth etc), the ATM-SWs 8, 9 and 10 establish connections for transmitting the voice data along a route II on which the data are transmitted in a sequence such as DTE 6→ATM-SW 9→ATM-SW 10→ATM-SW 8→DTE 5. Thus, the ATM-SWs 8, 9 and 10 set separate paths such as the route I and the route II and establish the respective connections. The plurality-of-connection call is thereby established.

There arise, however, the following problems inherent in the network system pertaining to the above preceding application. To be specific, under a condition shown in FIG. 38, if impossible of satisfying the QOS of the voice data between the ATM-SW 9 and the DTE 6 when trying to establish the connection of the route II, the path for the voice data on the route II can not be set. Accordingly, the connection could not be established by use of the route II, and the plurality-of-connection call could not be established.

Further, in the network system according to the preceding application, if the plurality-of-connection call is set on the route I and the route II as well, it is required that the DTE 5 should make the ATM-SW 8 recognize that the respective connections belong to the same call. It is therefore required that the DTE 5 be constructed to transfer and receive identifying data for specifying the plurality-of-connection call between the ATM-SW 8 and the DTE 5 itself. Accordingly, the use of the ATM-SW relative to the preceding application must involve the use of the DTE 5 having the above-described construction or must add the same construction to the conventional DTE 5.

SUMMARY OF THE INVENTION

It is a primary object of the present invention, which was contrived to obviate the above problems, to provide a network system and a switching unit that are capable-of establishing a plurality-of-connection call even if impossible of establishing any one of a plurality of connections between a call-out DTE and a call-in DTE on the occasion of establishing the plurality-of-connection call between the call-out DTE and the call-in DTE.

For accomplishing the above object, the present invention adopts constructions which follow.

According to a first aspect of the present invention, a network system comprises a first terminal equipment, a second terminal equipment, a third terminal equipment having the same content as that of the second terminal equipment, and a network for connecting the first terminal equipment, the second terminal equipment and the third terminal equipment to each other. In this network system, the network, when trying to set a plurality of connections on the basis of one call setting request between said first terminal equipment and said second terminal equipment, judges whether or not all of the plurality of connections can be set between said first terminal equipment and said second terminal equipment, sets a part of said plurality of connections between said first terminal equipment and said second terminal equipment if all of the plurality of connections can not be set, and sets a remaining connection between the first terminal equipment and said third terminal equipment.

According to the first aspect, if all of the plurality of connections can not be set between the first terminal equipment and the second terminal equipment, the network sets the part of connections between the first terminal equipment and the second terminal equipment, and sets the remaining connection between the first terminal equipment and the third terminal equipment. Each of the plurality of connections belonging to one call can be thereby set. Therefore, when setting the plurality-of-connection call between the first terminal equipment and the second terminal equipment, the plurality-of-connection call can be established even if all of the plurality of connections can not be set between the first terminal equipment and the second terminal equipment.

Herein, as a network, there may be exemplified, e.g., an ATM network (cell relay network), a frame relay switching network, or a packet switching network.

According to the first aspect, it is desirable that the network be constructed to, when receiving from said first terminal equipment a call setting request for setting the plurality of connections between said first terminal equipment and said second terminal equipment, sets a part of the connections between said first terminal equipment and said second terminal equipment and the remaining connection between said first terminal equipment and said third terminal equipment, and, in this case, notifies said first terminal equipment of a purport that all of the plurality of connections have been set between said first terminal equipment and said second terminal equipment.

With this construction, in such a case also that actually the plurality of connections for the plurality-of-connection call are set respectively between the first terminal equipment and the second terminal equipment and between the first terminal equipment and the third terminal equipment, the first terminal equipment recognizes that the plurality-of-connection call is established between the first terminal equipment itself and the second terminal equipment. Accordingly, on the occasion of embodying the present invention, there is no necessity for adding a special construction to the first terminal equipment. Namely, an existing terminal equipment (DTE) is usable as the first terminal equipment.

According to the first aspect, the network may be constructed to judge whether or not all of the plurality of connections can be set between said first terminal equipment and said second terminal equipment by judging whether or not said network can be satisfy quality of services required for setting the plurality of connections is satisfied between said first terminal equipment and said second terminal equipment. Herein, the quality of service (QOS) may include a bandwidth required for setting the connection.

According to a second aspect of the present invention, a network system comprising a first node accommodating a first terminal equipment, a second node accommodating a second terminal equipment and a third node accommodating a third terminal equipment having the same content as that of said second terminal equipment. The first node, when receiving from said first terminal equipment a call setting request for requesting a plurality of connections to be set between said first terminal equipment and said second terminal equipment, sets the plurality of connections with respect to said first terminal equipment, and transmits to said second node a connection request message for requesting the plurality of connections to be set between said first node and said second node. The second node, when receiving the connection request message from said first node, judges whether or not all of the plurality of connections can be set between said second node and said first node, when judging that all of the plurality of connections can not be set, sets a part of the plurality of connections between said second node, said node and said second terminal equipment, and transmits to said third node a substitute connection setting message for making a remaining connection set said third node. The third node receives the substitute connection setting message from said second node, and sets the remaining connection between said third node, said first node and said third terminal equipment on the basis of the substitute connection setting message.

According to the second aspect, the second node may be constructed to detect a usable bandwidth value between said second node, said first node and said second terminal equipment, compares the detected bandwidth value with bandwidth value required for setting all of the plurality of connections, and thereby judges whether or not all of the plurality of connections can be set.

According to the second aspect, the second node may be constructed to, if the usable bandwidth value between said second node, said first node and said second terminal equipment is under the bandwidth value required for setting all of the plurality of connections, sets at least a connection of which a securable bandwidth is requested among the plurality of connections, as said part of the plurality of connections.

According to the second aspect, the second node may be constructed to, if the plurality of connections can not be set between said first terminal equipment as a call-out terminal and said second terminal equipment as a call-in terminal, has data about said third terminal equipment as the call-in terminal replacing said second terminal equipment, and transmits to said third node the substitute setting message on the basis of the data about said third terminal equipment.

According to the second aspect, the second terminal equipment may be constructed to register said second node with the data about said third terminal equipment.

According to the second aspect, the second node may be constructed to, if the plurality of connections can not be set between said first terminal equipment as a call-out terminal and said second terminal equipment as a call-in terminal, obtains data about said third terminal equipment as the call-in terminal replacing said second terminal equipment, and transmits to said third node the substitute setting message on the basis of the data about said third terminal equipment.

According to the second aspect, the first node may be constructed to, when transmitting the connection request message, add an identifier for indicating that the plurality of connections belongs to the same call, receive the identifiers which are contained in the connection completion messages received from said second node and said third node, and recognize that the connection set with respect to said second node and the connection set with respect to said third node belong to the same call. The second node may be constructed to, when finishing a setting of the part of connections between the second node, the first node and the second terminal equipment, add said identifier to a connection completion message for indicating setting completion thereof, transmit the connection completion message to said first node, add said identifier to the substitute setting message, and transmit the substitute setting message to said third node. The third node may be constructed to, when finishing a setting of the remaining connection between the third node, the first node and the third terminal equipment, add the identifier to a connection completion message for indicating setting completion thereof, and transmit this connection completion message to the first node.

According to a third aspect of the present invention, a switching unit accommodating a first terminal equipment, connected to first other switching unit accommodating a second terminal equipment, and connected to second other switching unit accommodating a third terminal equipment having the same content as that of said first terminal equipment. The switching unit comprises a judging unit for judging, when received from said first other switching unit a connection request message for setting a plurality of connections belonging to one call between said second terminal equipment as a call-out terminal and said first terminal equipment as a call-in terminal, whether or not all of the plurality of connections can be set between said first other switching unit, the switching unit and said first terminal equipment. The switching unit further comprises a connection setting unit for establishing, if said judging unit judges that any one of the plurality of connections can not be set, a part of the plurality of connections between said second terminal equipment and said first terminal equipment by setting the part of connections between said second switching unit, the switching unit and said first terminal equipment. The switching unit further comprises a substitute connection setting-unit for specifying, if said judging unit judges that all of the plurality of connections can not be set, said third terminal equipment as a substitute terminal equipment becoming a call-in terminal replacing said first terminal equipment, and transmitting to said other switching unit a substitute setting massage for making said second other switching unit establish a remaining connection between said second terminal equipment and said third terminal equipment.

Herein, as the switching unit, there may be exemplified, e.g., an ATM switching unit, a frame relay switching unit, or a packet switching unit.

According to the third aspect, the switching unit further comprises a substitute terminal storing unit for storing data about the third terminal equipment in which registered by the first terminal equipment. The substitute connection setting unit transmits to said second other switching unit the substitute setting massage in accordance with said data. In this case, the substitute connection setting unit may be constructed to specify the substitute terminal equipment by obtaining data about the third terminal equipment from the first terminal equipment.

According to the network system and the switching unit of the present invention, when establishing the plurality-of-connection call between the call-out terminal equipment and the call-in terminal equipment, it is feasible to establish the plurality-of-connection call even if impossible of establishing any one of the plurality of connections with respect to the call-in terminal equipment.

Further, the connections capable of satisfying the quality of service among the plurality of connections are established on an original route, and only the connections incapable of satisfying the quality of service are established on other route. Hence, the bandwidth on the original route can be effectively utilized.

Moreover, the present invention can be carried out by use of the conventional terminal equipments, and hence there is no necessity for adding the special construction to the existing terminal equipment.

BRIEF DESCRIPTION OF THE DRAWINGS

Other objects and advantages of the present invention will become apparent during the following discussion in conjunction with the accompanying drawings, in which:

FIG. 9 is an explanatory diagram showing a connection request message transmitted from the call-out DTE;

FIG. 12 is an explanatory diagram showing a connection request message transmitted from the call-out DTE accommodation node;

FIG. 14 is an explanatory diagram showing the call management table in the call-in DTE accommodation node;

FIG. 15 is an explanatory diagram showing the connection request message transmitted from the call-in DTE accommodation node;

FIG. 16 is an explanatory diagram showing a completion-of-connection message transmitted from the call-in-DTE;

FIG. 17 is an explanatory diagram showing a connection transfer destination table in the call-in DTE accommodation node;

FIG. 18 is an explanatory diagram showing a substitute connection setting request message transmitted from the call-in DTE accommodation node;

FIG. 19 is an explanatory diagram showing the completion-of-connection message transmitted from the call-in DTE accommodation node;

FIG. 23 is an explanatory diagram showing the connection request message transmitted from the connection transfer destination node;

FIG. 24 is an explanatory diagram showing the completion-of-connection message transmitted from the connection transfer destination DE;

FIG. 25 is an explanatory diagram showing the completion-of-connection message transmitted from the connection transfer destination node;

FIG. 27 is an explanatory diagram showing the completion-of-connection message transmitted from the call-out DTE accommodation node;

FIG. 35 is an explanatory diagram showing a message transferred and received between the call-in DTE accommodation node and the call-in DTE;

DETAILED DESCRIPTION OF THE PREFERRED EMBODIMENTS

Illustrative embodiments of the present invention will hereinafter be described with reference to the accompanying drawings.

[Embodiment 1]

To begin with, an embodiment 1 of the present invention will hereinafter be described.

<Construction of Network System>

Figure 1:
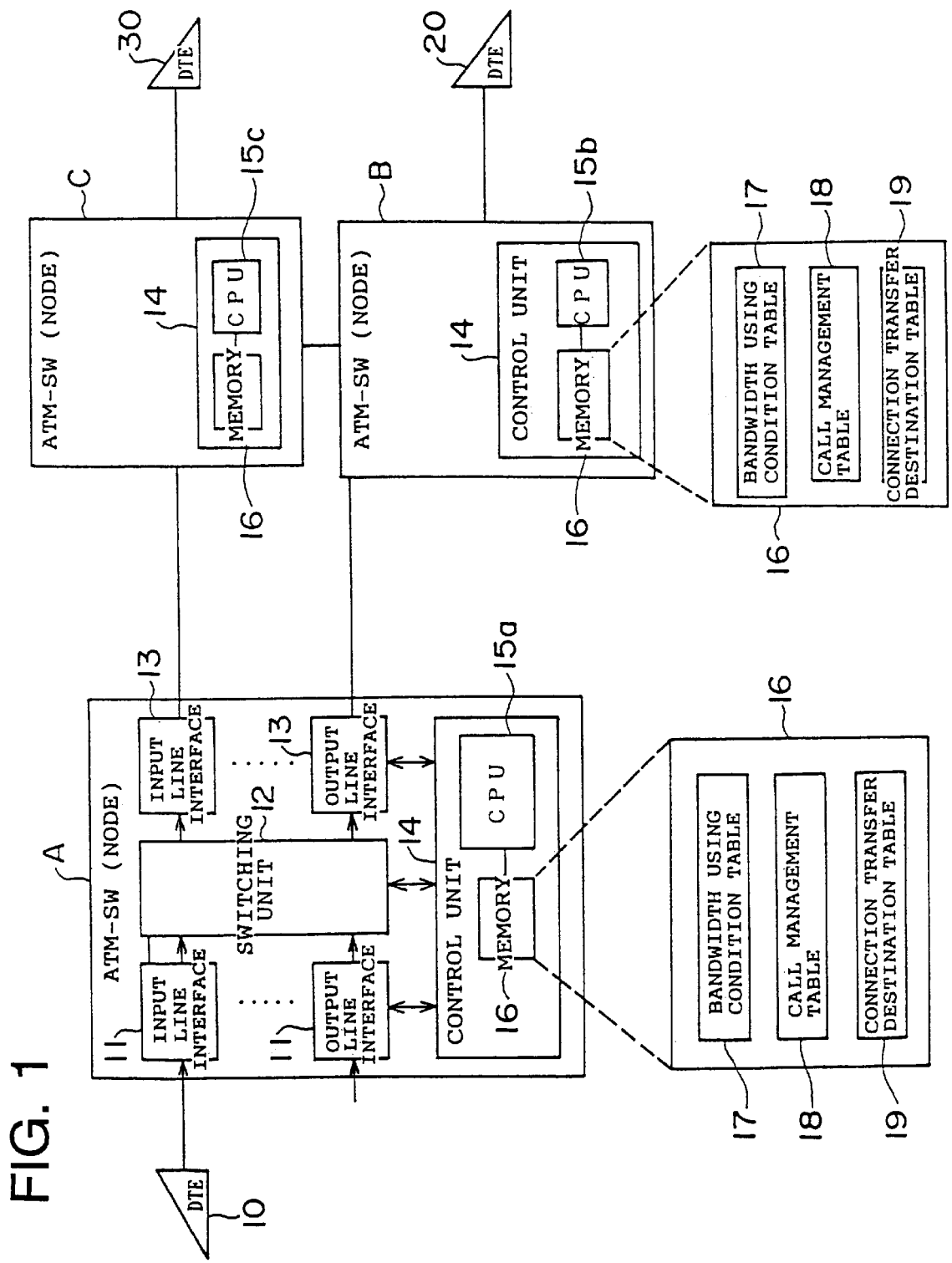
FIG. 1 is a diagram showing a construction of a network system in an embodiment 1.

FIG. 1 is a block diagram illustrating a network system in the embodiment 1. Referring to FIG. 1, the network system is constructed of an ATM network and a plurality of DTEs connected to this ATM network. The ATM network consists of ATM-SWs (hereinafter referred to as "nodes") A, B and C connected to each other via lines. The node A accommodates a DTE 10, the node B accommodates a DTE 20, and the node C accommodates a DTE 30.

Herein, the DTE 10 is defined as a computer (e.g., a personal computer, and a workstation etc) used by the user of the ATM network. The DTEs 20, 30 are classified as communication servers for providing multimedia services to the DTE 10 in response to a request from the DTE 10. The DTE 20 and the DTE 30 have the same contents. Namely, the DTEs 20, 30 have absolutely the same structures in terms of their hardware and software, and are capable of separately providing the DTE 10 with the same multimedia service.

The nodes A, B, C have substantially the same constructions. Exemplifying herein the node A, the node A is constructed of a plurality of input line interfaces 11, a switch unit 12, output line interfaces and a control unit 14.

Each of the input line interfaces 11 is connected via a line to any one of the DTE 10, the node B and the node C (a state of connection between the nodes B and C is not, however, shown). Further, each of the output line interfaces 13 is connected via a line to any one of the DTE 10, the node B and the node C (a state of connection to the DTE 10 is now, however, shown).

Each of the input line interfaces 11 and each of the output line interfaces 13 are circuits for implementing cell synchronization, a header exchange and multiplexing etc with respect to receiving signals, and implementing demultiplexing, buffering and the cell synchronization etc with respect to transmitting signals. The switch unit 12 executes routing of ATM cells supplied via the input line interfaces 11 or the output line interfaces 13 in accordance of contents of headers, and transmits the cells to desired lines via the input line interfaces 11 or the output line interfaces 13.

Further, the switch unit 12 supplies the input line interface 11 or the output line interface 13 with an ATM cell (a header of which is stored with a specific item of information) for a control signal. Moreover, each input line interface 11 and each output line interface 13 execute a process of an adaptation layer protocol of the control signal with respect to other nodes or other DTEs.

The control unit 14 is constructed based on a CPU 15a and a memory 16. The control unit 14 executes control of call setting and call releasing etc in accordance with information supplied from the input line interface 11 or the output line interface 13. The memory 16 is constructed of a semiconductor memory, a magnetic disk device and an optical disk device etc. This memory 16 retains a control program to be executed by the CPU 15a, a bandwidth using condition table 17 stored with information used for the call setting/releasing processes, a call management table 18, and a connection transfer destination table 19.

Figure 2:
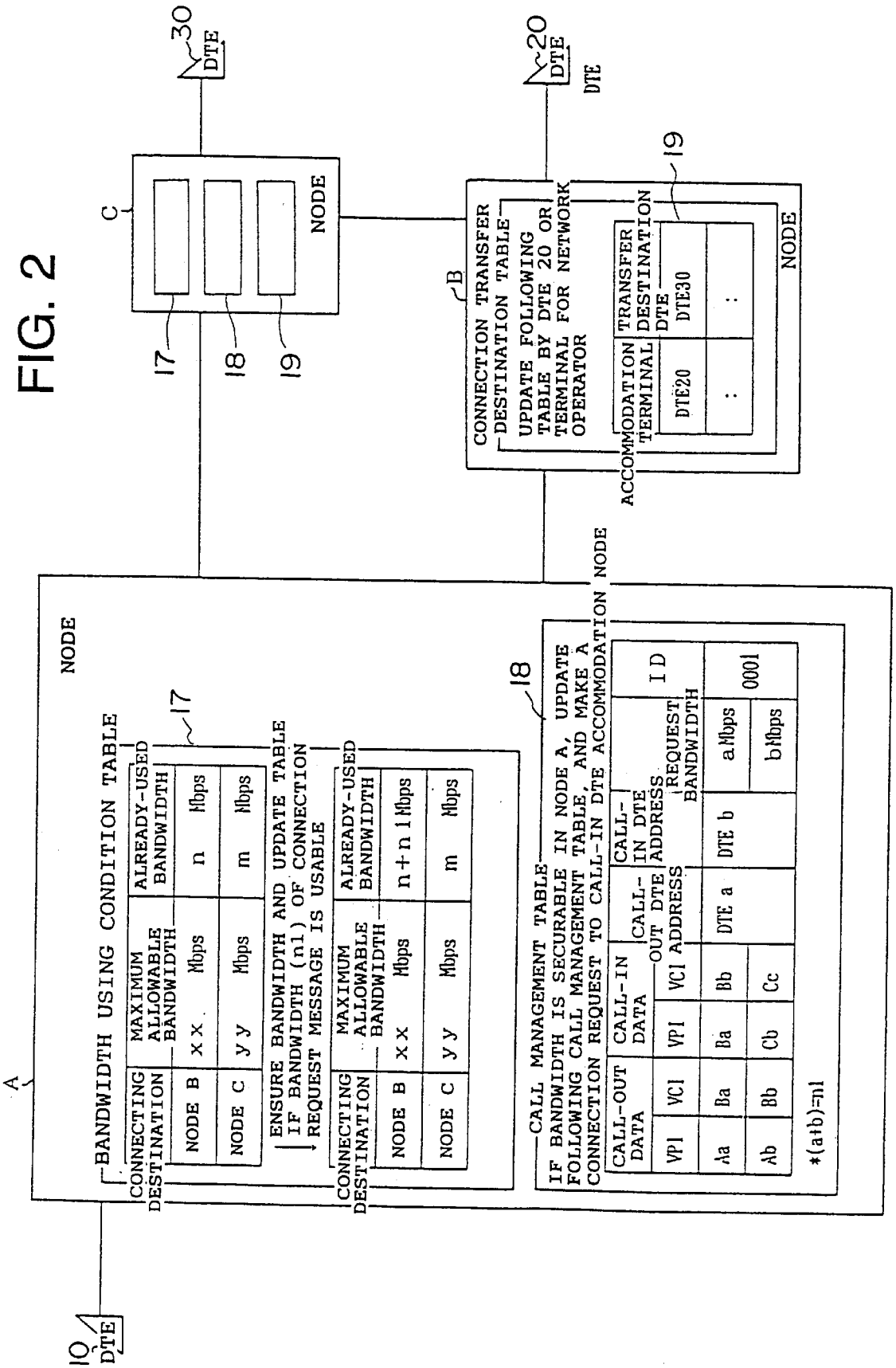
FIG. 2 is an explanatory diagram showing a table retained by each node.

FIG. 2 is an explanatory diagram showing each of the tables shown in FIG. 1. Referring to FIG. 2, the bandwidth using condition table 17 is a table from which to grasp a maximum allowable bandwidth per connected node and a present using bandwidth. That is, the bandwidth using condition table 17 is stored respectively with information on a call connected node, a value indicting the maximum allowable bandwidth, and a value indicating an already-used bandwidth.

The call management table 18 is a table for managing the call information between a call-out DTE and a call-in DTE per-connection with respect to a call having become capable of ensuring the bandwidth. Namely, the call management table 18 is stored with, as call-out information, a VPI (Virtual Path Identifier) defined as an identifier of a virtual path connection (VPC) on the call-out side (i.e., the DTE 10 side), and with a VCI (Virtual Channel Identifier) defined as an identifier of the virtual channel connection (VCC) on the call-out side. Moreover, the call management table 18 is stored with, as call-in information, the VPIs and the VCIs of the call-in side (i.e., the nodes B, C side). The call management table 18 is further stored with addresses of the call-out DTE and of call-in DTE, and with respective pieces of data about the bandwidths required of the respective connections.

Moreover, the table 18 is stored with a multimedia call ID (identifier) showing an identified call relative to the respective connections.

The connection transfer destination table 19 is a table for managing a transfer destination of the call-in DTE if impossible of ensuring a bandwidth for establishing a plurality of connection calls (multimedia calls) between the call-out DTE and the call-in DTE. This connection transfer destination table 19 is stored with information of the DTE accommodated in the node, and an address of a DTE (a transferred DTE) which replaces, if the relevant node and the accommodated DTE are unable to establish the connection therebetween, this accommodated DTE. The address of this transferred DTE is registered, for example, when an operator of the network registers the memory 16 of the node with attributes etc of the accommodated DTE.

<Processes in Network System>

Next, processes in the network system described above will be explained. Herein, there will be explained a process in which the DTE 10 shown in FIG. 1 becomes a receiver (a connection request terminal) of the multimedia services and requests the DTE 20 which provides the same services to provide the services, i.e., a process (a plurality-of-connection call setting process) of setting a plurality-of-connection call between the DTE 10 serving as a call-out DTE (calling DTE) and the DTE 20 serving as the call-in DTE (the called DTE).

Figure 3:
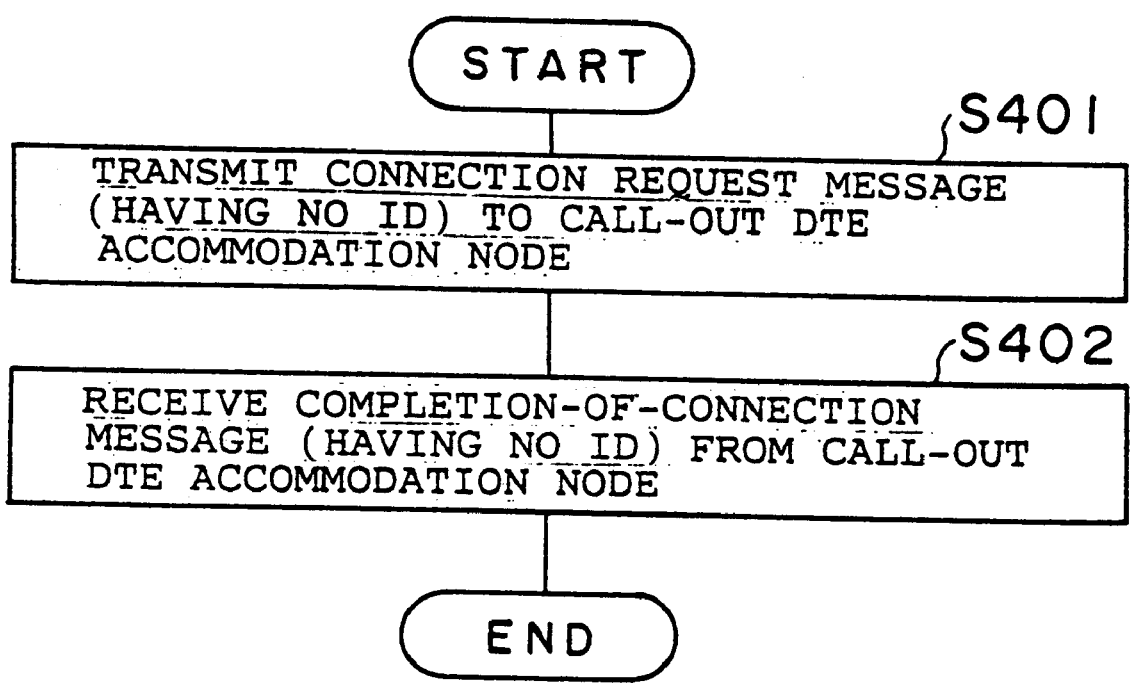
FIG. 3 is a flowchart showing a process by a call-out DTE.
Figure 4:
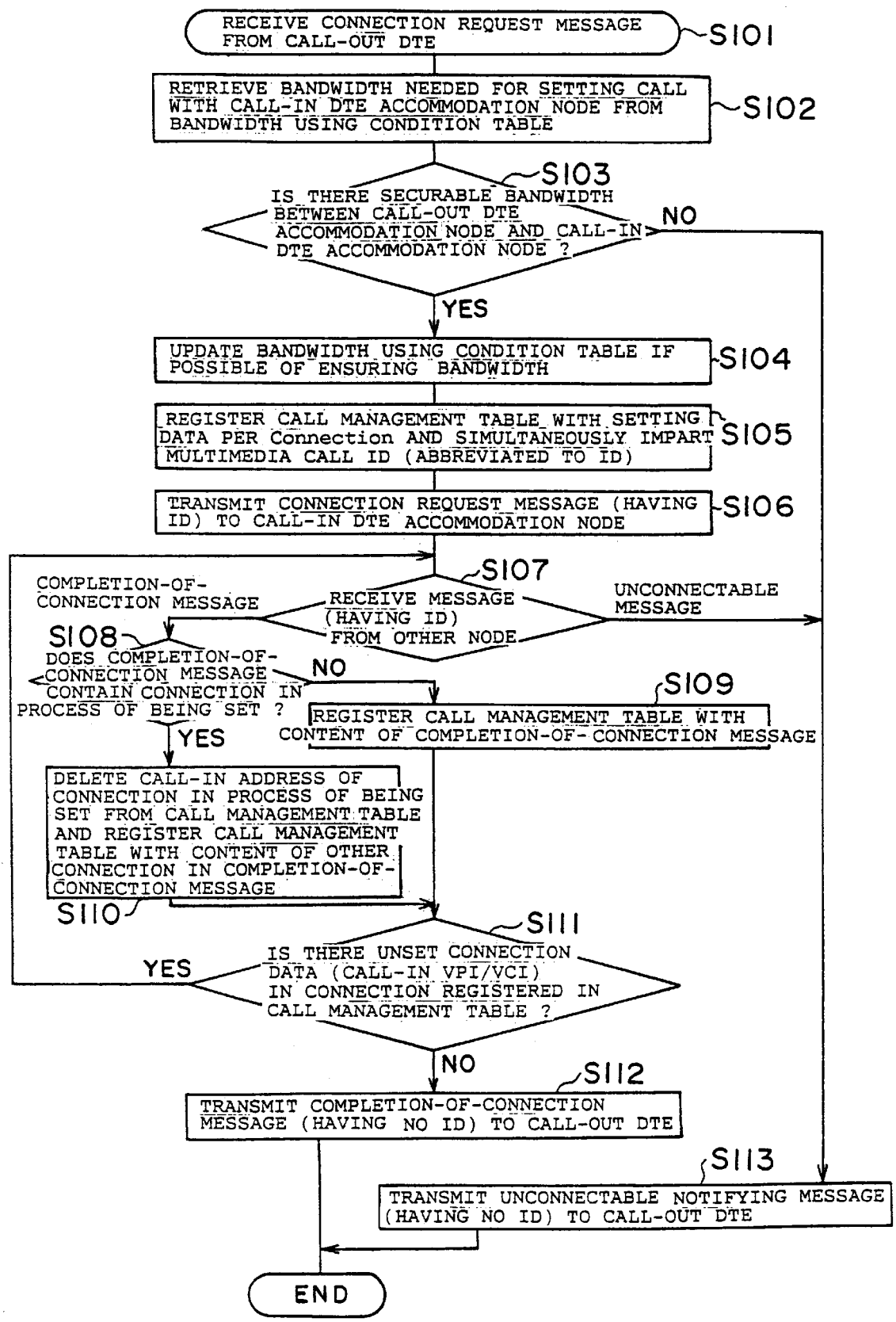
FIG. 4 is a flowchart showing a process by a call-out DTE accommodation node.
Figure 5:
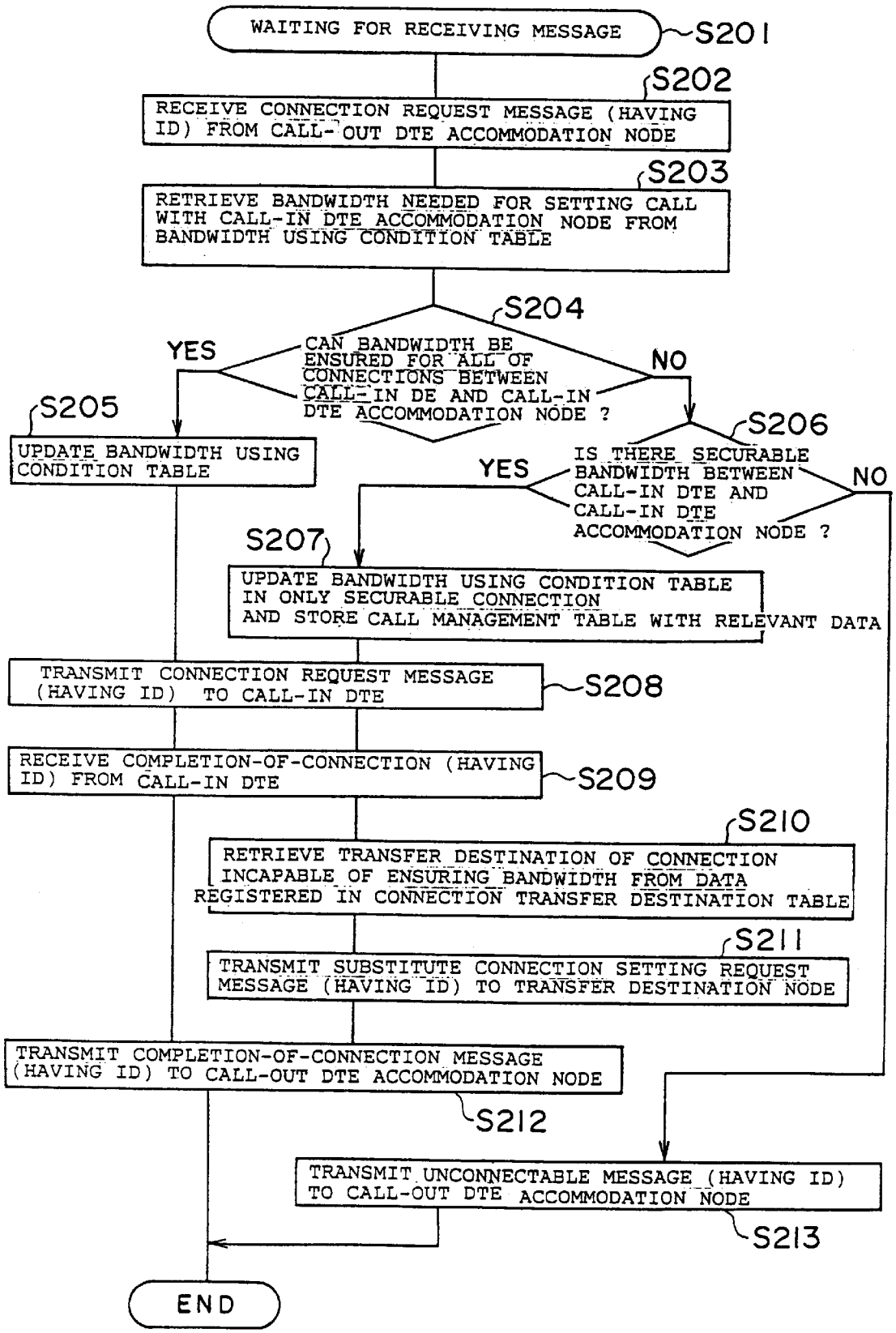
FIG. 5 is a flowchart showing a process by a call-in DTE accommodation node.
Figure 6:
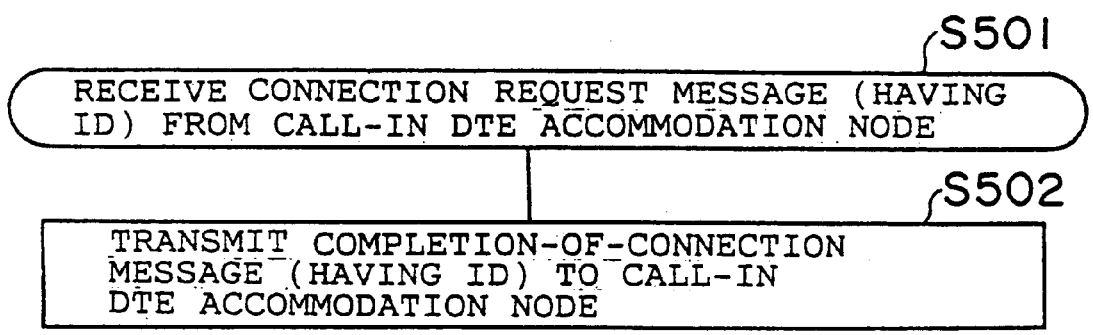
FIG. 6 is a flowchart showing a process by a call-in DTE.
Figure 7:
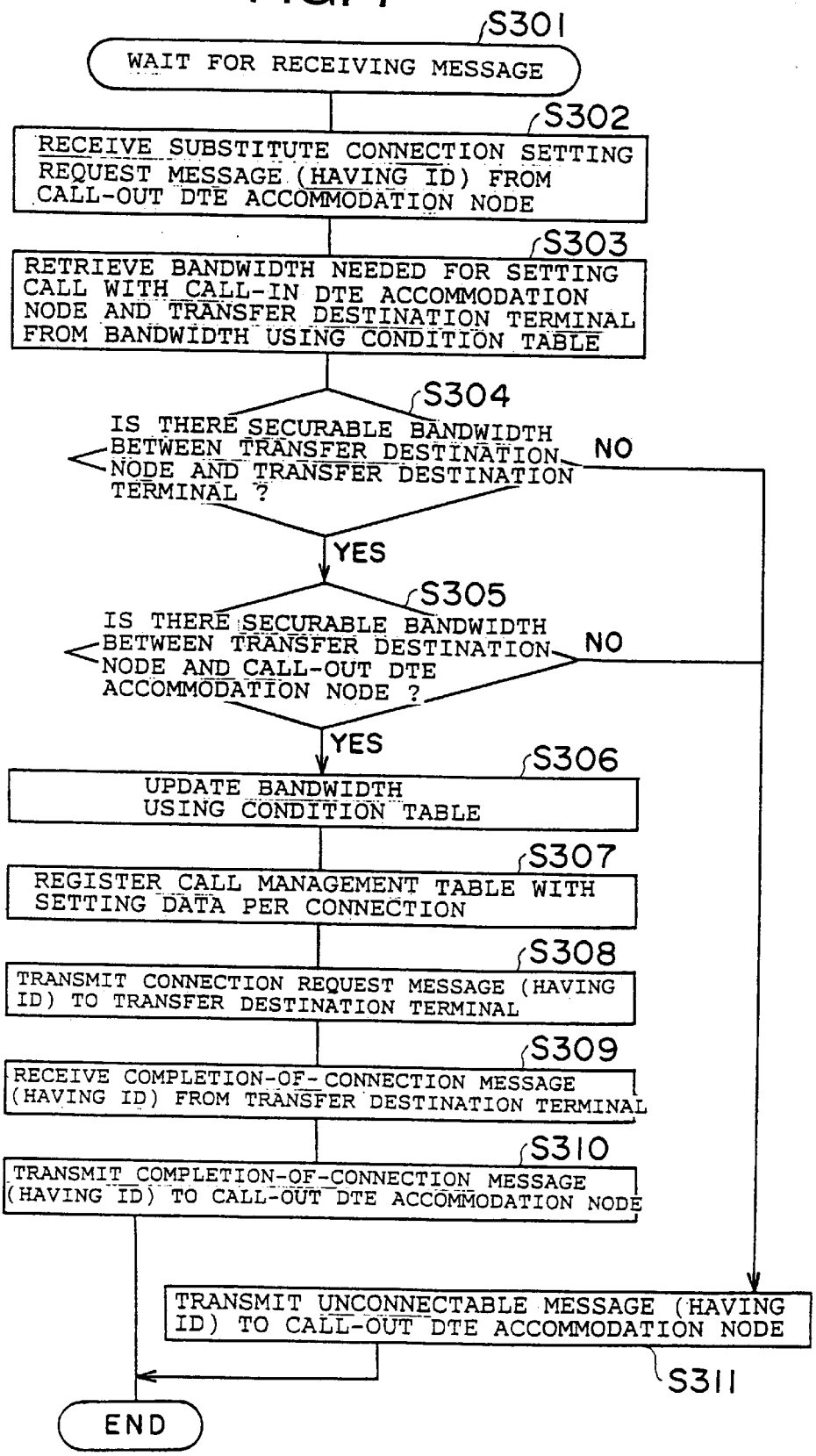
FIG. 7 is a flowchart showing a process by a connection transfer destination node.
Figure 8:
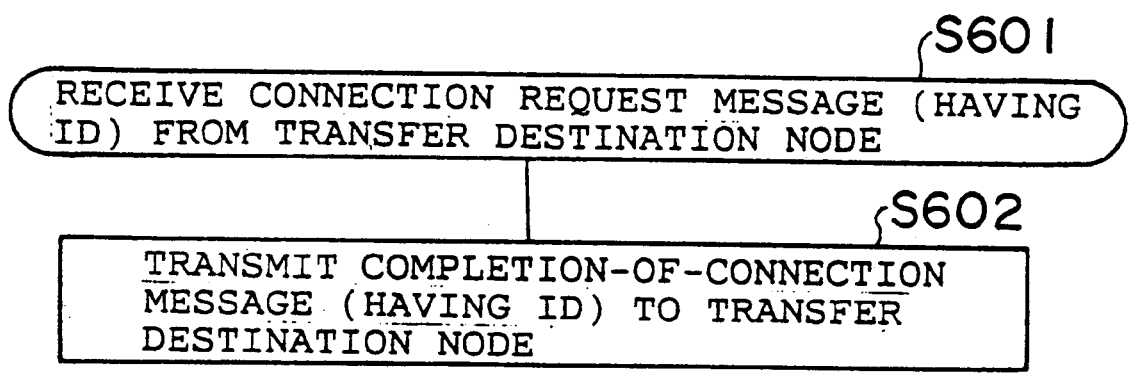
FIG. 8 is a flowchart showing a process by a connection transfer destination DTE.

Herein, the multimedia services supplied by the DTE 20 (or the DTE 30) consist of three media elements such as image data, text data and voice data. FIG. 3 is a flowchart showing a process by the DTE 10 when in the plurality-of-connection call setting process. FIG. 4 is a flowchart showing a process by the node A. FIG. 5 is a flowchart showing a process by the node B. FIG. 6 is a flowchart showing a process by the DTE 20. FIG. 7 is a flowchart showing a process by the node C. FIG. 8 is a flowchart showing a process by the DTE 30. Further, FIGS. 9–27 are explanatory diagrams of the plurality-of-connection call setting process.

Referring to FIG. 3, the plurality-of-connection call setting process starts just when a user of, e.g., the DTE 10 inputs to the DTE 10 a command purporting that the supply of the multimedia services be received. Upon the start of the processing, at first, the DTE 10 generates a call connection request message to the DTE 20, and transmits this connection request message to the node A (S401).

This connection request message, as illustrated in FIG. 9, according to the image data, the text data and the voice data, contains pieces of data about the VPI and VCI relative to the VPC and VCC for transferring respective pieces of data and about the bandwidths required for transferring the image data. Further, the connection request message shown in FIG. 9 contains data for specifying the call-out DTE (the DTE 10) and the call-in DTE (DTE 20).

The DTE 10, upon finishing the transmission of the connection request message, comes into a standby status for a completion-of-connection message corresponding to the connection request message to be transmitted.

The connection request message transmitted from the DTE 10 is transferred to the node A via the line, at which time the input line interface 11 of the node A connected to the DTE 10 receives the that connection request message. Then, the input line interface 11 inputs the data contained in the connection request message to the control-unit 14. With this processing, as shown in FIG. 4, the CPU 15a of the control unit 14 receives the data of the connection request message (S101), and executes a program for the plurality-of-connection call setting process stored in the memory 16. The CPU 15a thereby implements the following processes (see the flowchart in FIG. 4).

To be specific, the CPU 15a retrieves, from the bandwidth using condition table 17, the node (the node B) for accommodating the call-in DTE (the DTE 20) and the bandwidth needed for effecting the call setting (S102). More specifically, the CPU 15a reads a value of the already-used bandwidth and a value of the maximum allowable bandwidth with respect to the node B from the bandwidth using condition table 17, and takes a difference between these values, thus calculating a value (a usable bandwidth value) of a usable bandwidth. Subsequently, the CPU 15a calculates a total value (a request bandwidth total value) of the bandwidths (e.g., 10 Mbps, 64 Kbps, 1 Mbps shown in FIG. 9) required for transmitting the respective pieces of data on the basis of the data contained in the connection request message.

Subsequently, the CPU 15a judges whether or not there is a bandwidth that can be ensured between the call-out DTE accommodation node (the node A) and the call-in DTE accommodation node (the node B) (S103). That is, the CPU 15a subtracts the total value of the request bandwidths from the usable bandwidth value obtained in S102, and judges whether or not a result of this substraction becomes plus.

At this time, the CPU 15a, when judging that the result of the subtraction becomes minus (S103; NO), deems that there is no securable bandwidth, and makes the processing proceed to step S113. Whereas if the CPU 15a judges that the subtracted result becomes plus (S103; YES), the CPU 15a deems that there must be the securable bandwidth, and makes the processing proceed to S104.

Figure 10:
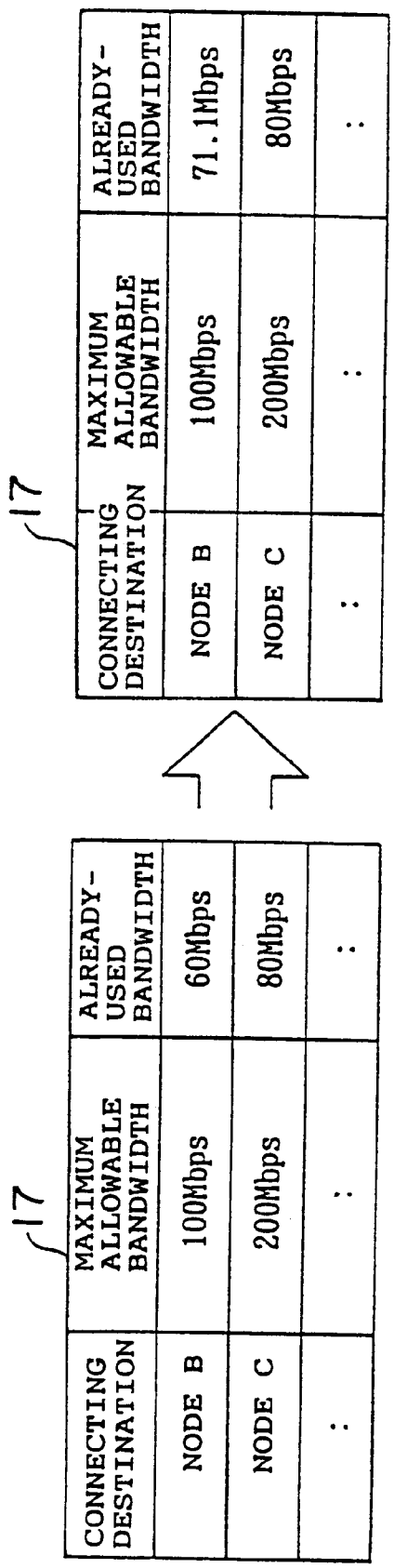
FIG. 10 is an explanatory diagram showing a bandwidth using condition in the call-out DTE accommodation node.

In S104, the CPU 15a updates the bandwidth using condition table 17. More specifically, the CPU 15a, as shown in FIG. 10, reads the already-used bandwidth value between the node A and the node B, which is stored at present in the bandwidth using condition table 17, adds the request bandwidth total value to the thus read value, and again stores a relevant area with this added value. Thereafter, the CPU 15a advances the processing to S105.

Figure 11:
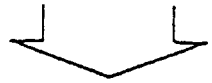
FIG. 11 is an explanatory diagram showing a call management table in the call-out DTE accommodation node.

In step S105, the CPU 15a registers the call management table 18 with setting data per connection, and imparts a multimedia call ID (hereinafter simply termed "ID"). Namely, the CPU 15a, as shown in FIG. 11, stores each of the relevant areas of the call management table 18 with each piece of data contained in the connection request message. Subsequently, the CPU 15a stores it with an ID "0001" indicating that respective connections with respect to the image data, the text data and the voice data are of the same call, making the ID corresponding to the data of each connection.

Incidentally, the connection request message received by the input line interface 11 of the node A is transferred to the switch unit 12, and the switch unit. 12 transfers the same message to the relevant output line interface 13. The CPU 15a adds the ID "0001" set in S105 to the connection request message transferred to the relevant output line interface 13 (S106).

Then, the connection request message (see FIG. 12) to which the ID "0001" is added, is transmitted to the node B. Thereafter, the CPU 15a comes to assume a status of waiting for a response message to the connection request message from other node (the node B or C) (S107).

On the other hand, when the connection request message sent from the node A is transferred to the node B, the input line interface 11 of the node B inputs to the control unit 14 the data contained in that connection request message (S201, S202: see FIG. 5).

Thus, when the connection request message is received by the node B, a CPU 15b of the node B executes the plurality-of-connection call setting program stored in the memory 16. The CPU 15b thereby executes the following processes (see a flowchart in FIG. 5).

To be specific, the CPU 15b retrieves the bandwidth needed for effecting the call setting with respect to the call-in DTE (the DTE 20) from the bandwidth using condition table 17(S203). More specifically, the CPU 15b reads a value of the already-used bandwidth and a value of the maximum allowable bandwidth with respect to the DTE 20 from the bandwidth using condition table 17, and takes a difference between these values, thus calculating a value (the usable bandwidth value) of a usable bandwidth. Subsequently, the CPU 15b calculates a total value (the request bandwidth total value) of the bandwidths (10 Mbps, 64 Kbps, 1 Mbps shown) required for transmitting the respective pieces of data on the basis of the data contained in the connection request message.

Subsequently, the CPU 15b judges whether or not there is a securable bandwidth with respect to all the connections requested between the call-in DTE accommodation node (the node B) and the call-in DTE (the DTE 20) (S103). That is, the CPU 15b subtracts the total value of the request bandwidths from the usable bandwidth value calculated in S203, and judges whether or not a result of this substraction becomes plus. At this time, the CPU 15b, when judging that the result of the subtraction becomes minus, namely judges that all the bandwidths can not be ensured (S204; NO), and makes the processing proceed to step S206. Whereas if the CPU 15b judges that the subtracted result becomes plus, the CPU 15b namely judges that all the bandwidths are securable (S204; YES), and makes the processing proceed to S205.

In the case of advancing the processing to S205, the CPU 15b updates the bandwidth using condition table 17. More specifically, the CPU 15b reads the already-used bandwidth value of the node B, which is stored at present in the bandwidth using condition table 17, adds the request bandwidth total value to this value, and again stores a relevant area with this added value. Thereafter, the CPU 15b advances the processing to S208.

On the other hand, the CPU 15b, when making the processing proceed to S206, judges whether or not there is a bandwidth securable for setting any one of the three connections between the node B and the DTE 20 (S206). That is, the CPU 15b judges whether or not the present usable bandwidth between the B and the DTE 20 can be allocated to any one of the connection for transmitting the image data, the connection for transmitting the text data, and the connection for transmitting the voice data.

At this time, the CPU 15b, when judging that the present usable bandwidth can not be allocated to any one of the connections requested (S206; NO), generates an unconnectable message (purporting that the connection can not be set between the call-out DTE and the call-in DTE), and transmits this unconnectable message to the node A (S213), thereby finishing the processing by the node B. By contrast, the CPU 15b, in the case of judging that the present usable bandwidth is allocated to any one the connection requested (S206; YES), advancing the processing to S207.

The CPU 15b, when making the processing proceed to S207, updates the bandwidth using condition table 17 with respect to only the connection in which the bandwidth can be ensured. Namely, the CPU 15b reads the already-used bandwidth value between the node B and the DTE 20, which is stored at present in the bandwidth using condition table 17, adds, to this value, a value of the bandwidth requested of the connection in which the bandwidth is securable, and again stores a relevant area with this added value.

Figure 13:
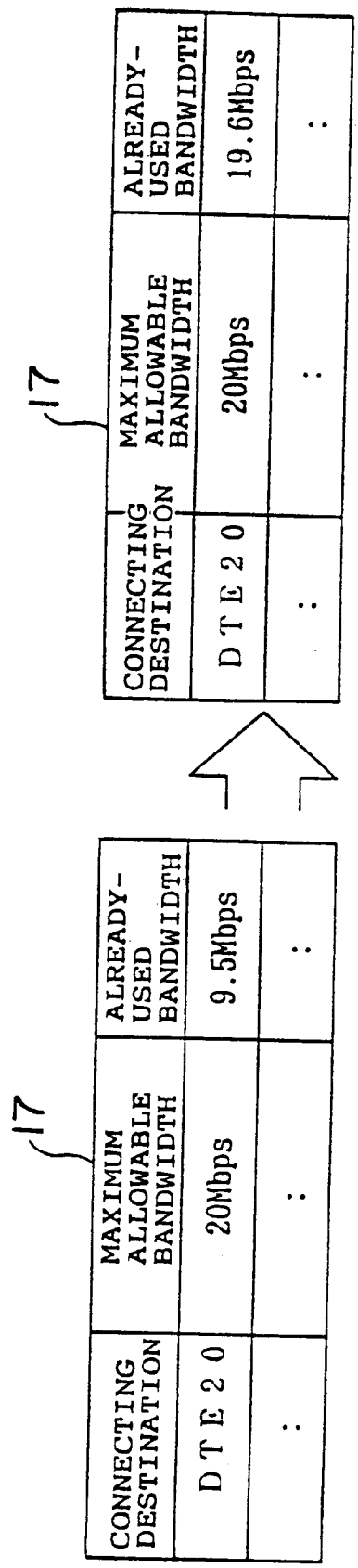
FIG. 13 is an explanatory diagram showing the bandwidth using condition table in the call-in DTE accommodation node.
Figure 20:
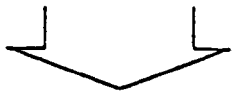
FIG. 20 is an explanatory diagram showing the call management table in the call-out DTE accommodation node.

Herein, it is presumed that the usable bandwidths can be allocated to, e.g., the connection for transmitting the image data and connection for transmitting the text data among the three connections. In this case, as shown in FIG. 13, the values of the bandwidths (10 Mbps, and 64 Kbps) required of those connections are added to the present already-used bandwidth value and then stored. At this time, the VPC and VCC used for those connections are determined.

Further, the CPU 15b, as shown in FIG. 14, stores the call management table 18 with information (call-out information, call-out DTE address, a call-in DTE address, a request bandwidth, and ID"0001": see FIG. 12) based on the connection request message received from the node A with respect to the connection for transmitting the image data and the connection for transmitting the text data. At this time, the CPU 15b stores the table 18, as call-in information, with each of the VPI and VCI of the connection set between the node B and the DTE 20. For instance, if exemplified as above, the table 18 is stored with the VPI and the VCI of the connection for transmitting the image data and of the connection for transmitting the text data. Thereafter, the CPU 15b makes the processing proceed to S208.

When the processing proceeds to S208, the connection request message is transmitted from the relevant output line interface 13 to type DTE 20. At this time, when the processing proceeds to S208 via S205, the connection request message containing data about all the connections. While on the other hand, when the processing proceeds to S208 via S207, the connection request message contains only data relative to the connections (for transmitting the image data and for transmitting the text data) in which the bandwidths are ensured. Thereafter, the CPU 15b stands by for an end-of-connection message given from the DTE 20.

As shown in FIG. 6, the DTE 20, when receiving the connection request message sent from the node B (S501), sets the connection between the node B and the DTE 20 based on the connection request message. Then, upon a completion of this setting, the DTE 20 transmits a completion-of-connection message corresponding to the connection request message (S502).

Herein, if the connection request message has a content of requesting the setting of all the connections for the image data, the text data and the voice data, all those connections are set, and the completion-of-connection message containing a content purporting that the setting of each connection is completed, is transmitted to the node B. In contrast with this, if the connection request message has a content of requesting the setting of only the connections for the image data and the text data, those respective connections are set, and the completion-of-connection message (see FIG. 16) containing a content purporting that the setting of each connection is completed, is transmitted to the node B.

Referring back to FIG. 5, the CPU 15b of the node B, when the node B receives the completion-of-connection message transmitted from the DTE 20 (S209), the CPU 15b of the node B judges a content of the completion-of connection message received. At this time, if the completion-of-connection message has a content purporting that the respective connections for transmitting the image data, the text data and the voice data are completely set between the node B and the DTE 20, the CPU 15*b* of the node B advances the processing to S212.

On the other hand, if the completion-of-connection message received by the node B has a content purporting that the respective connections for transmitting the image data and the text data are completely set between the node B and the DTE 20, the CPU 15*b* makes the processing proceed to S210.

The CPU 15*b* retrieves, from the connection transfer destination table 19, a transfer destination of the connection (for transmitting the voice data) in which the bandwidth could not be ensured. Herein, it is assumed that the connection transfer destination table 19 be, as shown in FIG. 17, stored with data about the DTE 30 as data about the transfer destination DTE (becoming a call-in DTE replacing the DTE 20) with respect to the DTE 20.

Then, the CPU 15*b* generates a substitute connection setting request message (see FIG. 18) defined as a message with a purport of requesting the setting of the connection for transmitting the voice data to the DTE 30 in place of the DTE 20. At this time, the substitute connection setting request message is stored with an address of the DTE 10 as an address of the call-out DTE. Then, this substitute connection setting request message is transmitted to the transfer destination node (which is herein the node C) defined as a node for accommodating the transfer destination DTE (S211). Thereafter, the CPU 15*b* makes the processing proceed to S212.

The CPU 15*b*, when advancing the processing to S212, adds the ID "0001" indicating that the respective connections are of the same call, to the completion-of-connection message received from the DTE 20, then transmits this completion-of-connection message to the node A, and finishing the processing by the node B.

At this time, the process in S212 is executed immediately after the process in S209, in which case the completion-of-connection message purporting that all the connections for transmitting the image data, the text data and the voice data are established between the node B and the DTE 20, is transmitted to the node A.

On the other hand, if the process in S212 is executed through the process on S211, as shown in FIG. 19, the completion-of-connection message containing a purport that the respective connections for transmitting the image data and the text data are established between the node B and the DTE 20, and a purport (a substitute connection setting notification) that the connection for transmitting the voice data is in the process of being set, is transmitted to the node A.

When the node A receives the completion-of-connection message or the unconnectable message transmitted from the node B through the processing by the node B which has be explained above, the CPU 15*a* of the node A resumes the processing in a manner which follows.

To be specific, the CPU 15*a*, as shown in FIG. 4, judges whether the message received is the completion-of-connection message or the unconnectable message (S107). At this time, the CPU 15*a*, when judging that the above message is the unconnectable message, makes the processing proceed to S113. By contrast, the CPU 15*a*, when judging that the message is the completion-of-connection message, advances the processing to S108.

The CPU 15*a*, in the case of advancing the processing to S108, judges whether or not the data about the connection in the process of being set are contained in the completion-of-connection message. At this time, the CPU 15*a*, when making a judgement of the message not containing the data about the connection in the process of being set (S108; NO), stores the call management table 18 with a content of this completion-of-connection message on the basis of the ID "0001", and makes the processing proceed to S111.

Whereas if the CPU 15*a* judges that the data of the connection in the process of being set is contained therein (S108; YES), the CPU 15*a* stores the call management table 18 with the VPI and the VCI (see FIG. 19) on the call-in side on the basis of the ID "0001" contained in the completion-of-connection message, and deletes from the call management table 18 the address of the call-in DTE of the connection in the process of being set (S108: see FIG. 20). Thereafter, the CPU 15*a* makes the processing proceed to S111.

The CPU 15*a*, when advancing the processing to S111, judges whether or not pieces of unset connection data (call-in data, and a call-in DTE address) are contained in the data of each connection stored in the call management. table 18. Namely, the CPU 15*a* judges whether or not the setting of all the connections for transmitting the image data, the text data and the voice data is ended.

At this time, the CPU 15*a*, when judging that there is no unset connection data (S111; NO), deems that the setting of all the connections has been finished, and makes the processing proceed to S112.

By contrast, the CPU 15*a*, when judging that there are the unset connection data (S111; YES), deems that the setting of any one of the connections is not yet ended, and again waits for the completion-of-connection message relative to the unset connection from other nodes.

Incidentally, if the substitute connection set request message is transmitted from the node B to the node C, the processes of the node C and of the DTE 30 are to be carried out. A CPU 15*c* of the node C, when starting the plurality-of-connection call setting process, as shown in FIG. 7, is in a status of accepting the substitute connection setting request message from the node B (S301).

Then, the CPU 15*c*, upon receiving the substitute connection setting request message from the node B (S302), retrieves, from the bandwidth using condition table 17, the respective bandwidths necessary for setting the call with respect to the call-out DTE accommodation node (the node A) and the transfer destination terminal (the DTE 30) (S303).

For instance, it is presumed that the content of the substitute connection setting request message is a request for setting the connections as remaining connections for transmitting the above voice data (1 Mbps) between the node C and the node A, and between the node C and the DTE 30.

Thereupon, the CPU 15*c* reads a value of the already-used bandwidth and a value of the maximum allowable bandwidth with respect to the node A from the bandwidth using condition table 17, and takes a difference between these values, thus calculating a value (a usable bandwidth value) of a usable bandwidth. Similarly, the CPU 15*c* reads a value of the already-used bandwidth and a value of the maximum allowable bandwidth with respect to the DTE 30 from the bandwidth using condition table 17, and takes a difference between these values, thus calculating a value (the usable bandwidth value) of a usable bandwidth.

Thereafter, the CPU 15*c* makes the processing proceed to S304. If the substitute connection setting request message has a content with a purport of setting two or more connections, however, there is calculated a total value (a request bandwidth total value) of the bandwidths required for setting the two or more connections in S304.

The CPU 15c, when advancing the processing to S304, judges whether or not there is a securable bandwidth between the transfer destination node and the transfer destination terminal. Namely, the CPU 15c subtracts the request bandwidth value (1 Mbps) for the voice data from the usable bandwidth values between the node C and the DTE 30 that has been calculated in S303, and judges whether or not a result of the substraction becomes plus. At this time, the CPU 15c, when judging that the result of the subtraction is minus, i.e., when deeming that the bandwidth can not be ensured (S304; NO), makes the processing proceed to step S311. Whereas if the CPU 15c judges that the subtracted result becomes plus, viz., judges that the band width can be ensured (S304; YES), makes the processing proceed to S305.

The CPU 15c, when advancing the processing to S305, judges whether or not there is the securable bandwidth between the transfer destination node and the call-out DTE accommodation node. Namely, the CPU 15c subtracts the request bandwidth value (1 Mbps) from the usable bandwidth values between the node C and the node A that has been calculated in S303, and judges whether or not a result of the substraction becomes plus. At this time; the CPU 15c, when judging that the result of the subtraction is minus, i.e., when judging that the bandwidth can not be ensured (S305; NO), makes the processing proceed to step S311. Whereas if the CPU 15c judges that the subtracted result is plus, viz., judges that the band width can be ensured (S305; YES), makes the processing proceed to S306 after determining the VPC and the VCC used for setting the connection for transmitting the voice data.

Figure 21:
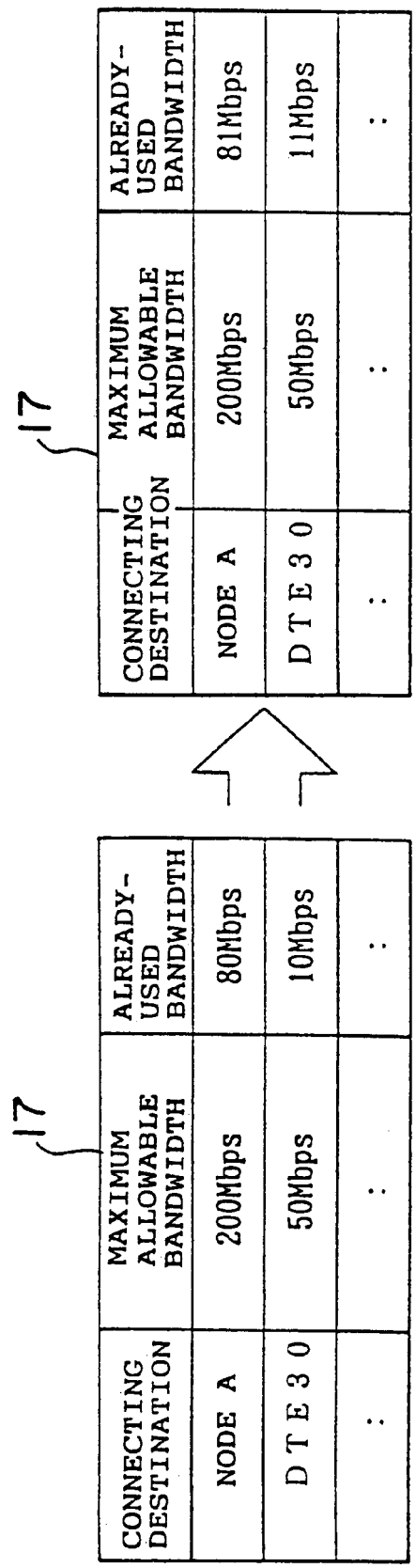
FIG. 21 is an explanatory diagram showing the bandwidth using condition table in a connection transfer destination node.

The CPU 15c, when advancing the processing to S306, updates the bandwidth using condition table 17. More specifically, the CPU 15c, as shown in FIG. 21, reads the already-used bandwidth value of the node B that is stored at present in the bandwidth using condition table 17, then adds the request bandwidth value to this value, and again stores a relevant area with this added value.

Figure 22:
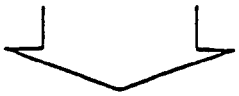
FIG. 22 is an explanatory diagram showing the call management table in the connection transfer destination node.

Subsequently, the CPU 15c, as shown in FIG. 22, stores the call management table 18 with the call-out DTE address, the call-in DTE address, the request bandwidth and the ID "0001" among pieces of data about the connection for transmitting the voice data on the basis of a content of the substitute connection setting request message (S307). At this time, the CPU 15c stores the call management table 18 with the VPI and the VCI corresponding to the determined VPC, VCC as the call-out data and the call-in data.

Subsequently, the CPU 15c generates a connection request message shown in FIG. 23 on the basis of the data stored in the call management table 18, and transmits this message to the DTE 30 via the relevant output line interface 13 (S308). Thereafter, the CPU 15c comes into the standby status for a message given from the DTE 30.

As illustrated in FIG. 8, the DTE 30, upon receiving the connection request message transmitted from the node C (S601), sets the connection for transmitting the voice data between the node C and the DTE 30 on the basis of the connection request message. Then, the DTE 30, upon a completion of the setting of the connection, generates the completion-of-connection message (see FIG. 24) corresponding to the connection request message, and transmits this message to the node C (S602).

Referring back to FIG. 7, when the completion-of-connection message transmitted from the DTE 30 is received by the node C (S309), the CPU 15c adds the ID "0001" contained in the connection request message) to the completion-of-connection message (see FIG. 25). Subsequently, the CPU 15c transmits the completion-of-connection message to the node A (S310), and finishes the processing by the node C.

Note that the CPU 15c, in the case of advancing the processing to S311, deems that the connection can not be set between the node C and the node A or between the node C and the DTE 30, and transmits the unconnectable messages to the node A, thus finishing the process by the node C.

Referring back to FIG. 4, when the node A receives the completion-of-connection message or the unconnectable message transmitted from the node C, the CPU 15a of the node A executes the above-described process in S107. Then, the CPU 15a, when judging that the message received is the unconnectable message, makes the processing proceed to S113. By contrast, the CPU 15a, when judging that the message received is the completion-of-connection message, makes the processing proceed to S109 via S108.

Figure 26:
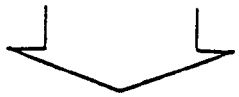
FIG. 26 is an explanatory diagram showing the call management table in the call-out DTE accommodation node.

Then, the CPU 15a stores the relevant areas of the call management table 18 respectively with the call-in data and the call-in DTE address on the basis of the ID"0001" contained in the completion-of-connection message received from the node C in S109 (the see FIG. 26). Thereafter, the CPU 15a advances the processing to S111, and judges that there is no unset connection data in the call management table (S111; YES). The processing then proceeds to S112.

The CPU 15a, when making the processing proceed to S112, transmits the completion-of-connection message to the DTE 10. At this time, the CPU 15a, as shown in FIG. 27, generates the completion-of-connection message in which the call-in DTE is the DTE 20 and from which the ID"0001" is eliminated, and transmits this message to the DTE 10, thereby finishing the processing by the node A.

On the other hand, the CPU 15a, when advancing the processing to S113, generates the unconnectable message not containing the ID"0001", and transmits this message to the DTE 10, thereby finishing the processing by the node A. The CPU 15a, however, in the case of executing the process in step S0113 by receiving the unconnectable message from the node B or C, returns the stored contents in the bandwidth using condition table 17 and in the call management table 18 to the statuses set when receiving the connection request message from the DTE 10.

Then, referring back to FIG. 3, when the DTE 10 receives the completion-of-connection message or the unconnectable message transmitted from the node A (S402), the plurality-of-connection-calls setting process comes to an end. In the case of the DTE 10 having received the unconnectable message, however, an assumption is that the plurality of connection calls are not established between the DTE 10 and the DTE 20, and consequently the plurality-of-connection call setting process is finished.

By contrast, when the DTE 10 receives the completion-of-connection message, it is assumed that the plurality of connection calls are established between the DTE 10 and the DTE 20, and hence the plurality-of-connection call setting process is ended. Herein, the completion-of-connection message contains neither the ID "0001" indicating the sale call nor the purport that the DTE 30 becomes the call-in DTE instead of the DTE 20 with respect to the connection for transmitting the voice data. Therefore, the DTE 10 deals with the processing on the assumption that the plurality-of-connection call is established between the DTE 20 and the DTE 10 itself.

Then, after the plurality-of-connection call setting process has been ended upon establishing the plurality of connection calls, the image data and the text data are transmitted to the DTE 10 from the DTE 20, and at the same time the voice data are transmitted to the DTE 10 from the DTE 30. Accordingly, it follows that the DTE 10 receives a supply of services of the multimedia consisting of the image data, the text data and the voice data.

Figure 28:
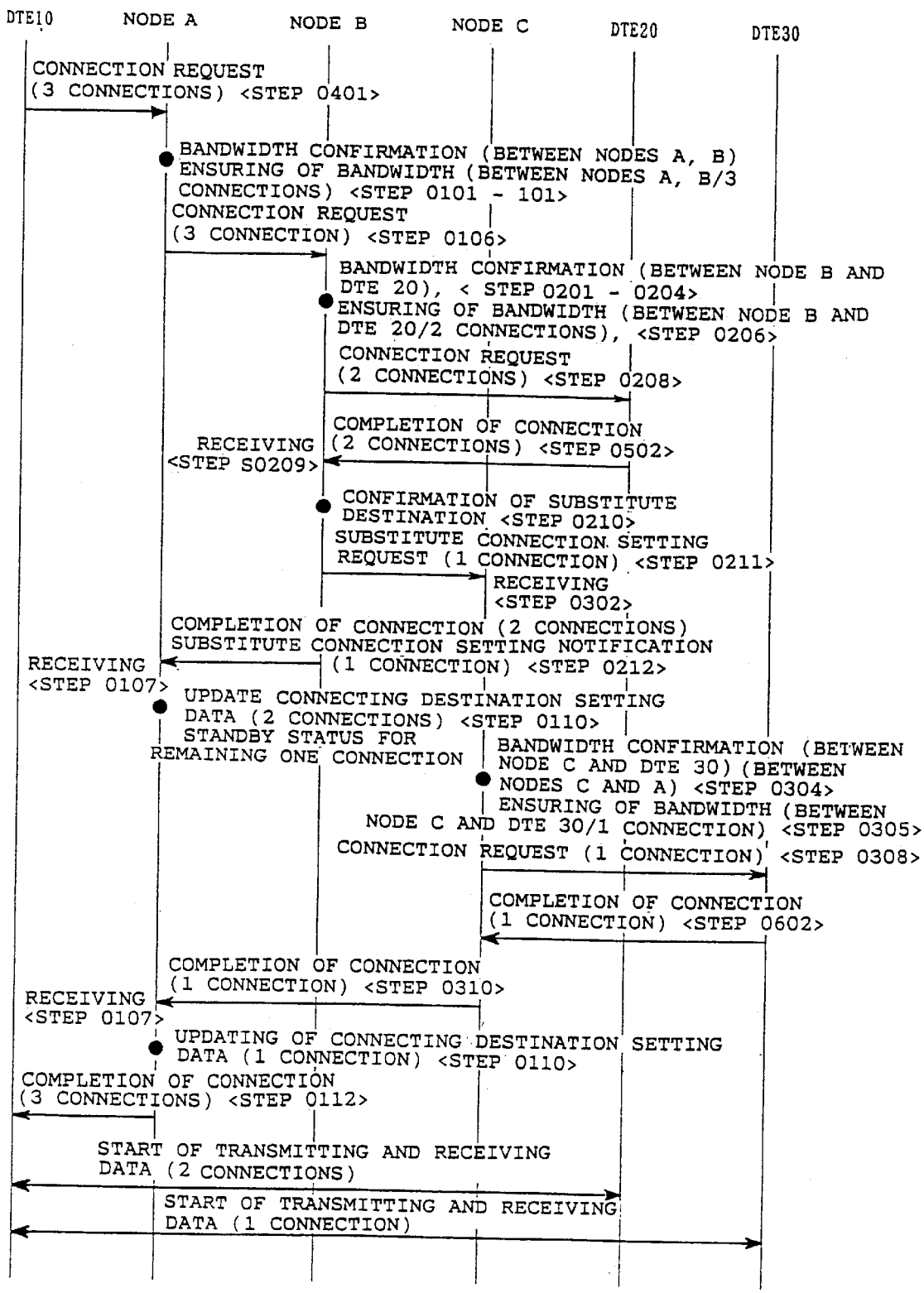
FIG. 28 is a sequence diagram showing a plurality-of-connection call setting process.

FIG. 28 is a sequence diagram showing a flow of control signal (a message) in the plurality-of-connection-calls setting process described above. Referring to FIG. 28, however, there is shown how the plurality-of-connection call setting process is conducted when the two connections among the three connections are established between the DTE 10 and the DTE 20 and when one remaining connection is established between the DTE 10 and the DTE 30 in the case of establishing the plurality of connection calls for setting the three connections trough one call.

Referring again to FIG. 28, when the DTE 10 transmits to the node A the connection request message with a purport of setting the three connections (S401), the node A confirms the usable bandwidth values between the node A and the node B and secures the bandwidth requested for setting the three connections (S101–S104). The three connections are thereby respectively set between the DTE 10 and the node A.

Thereafter, the node A transmits the connection request message for the three connections to the node B (S106). Thereupon, the node B confirms the usable bandwidth values between the node B and the DTE 20 (S201–S204). At this time, if only three connections among the three connections can be ensured (S204; NO), the bandwidths for these two connections are ensured (S206), and the connection request message for these two connections is transmitted from the node B to the DTE 20 (S208).

Thereafter, the DTE 20 transmits the completion-of-connection message to the node B (S502), and, when the node B receives this completion-of-connection message (S209), the DTE (the DTE 30) becoming the call-in DTE in place of the DTE 20 is confirmed (S210). Then, the node B transmits the substitute connection setting request relative to one remaining connection to the node C.

Subsequently, the two connections among the three connections are set between the node B and the DTE 20, and the completion-of-connection message containing such a purport that one remaining connection is in the process of being set, is transmitted from the bode B to the node A. Thereupon, the node A stores the call management table 18 with data about the two connections on the basis of the data contained in the above completion-of-connection message (S110). Subsequently, the node A waits for the completion-of-connection message regarding one remaining connection.

On the other hand, the node C, upon receiving the substitute connection setting request message from the node B (S302), confirms the bandwidths between the node C and the DTE 30, and between the node C and the node A (S304), and secures the bandwidths needed for setting one remaining connection therebetween (S305). Subsequently, the node C transmits to the DTE 30 the connection request message with a purport of setting one remaining connection between the node C and the DTE 30 (S308).

The DTE 30, upon receiving the connection request message transmitted from the node C (S601), transmits the completion-of-connection message corresponding to this connection request message to the node C (S602). Then, when the node C receives the completion-of-connection message from the DTE 30, this completion-of-connection message is transmitted to the node A (S310).

The node A, upon receiving the completion-of-connection message transmitted from the node C (S107), updates the call management table 18 on the basis of the data about one remaining connection which are contained in the completion-of-connection message (S110). Then, the node A transmits to the DTE 10 the completion-of-connection message purporting that the thee connections have been completely set between the DTE 10 and the DTE 20 on the basis of the stored contents in the call management table 18 (S112).

Then, when the DTE 10 receives the completion-of-connection message transmitted from the node A (S402), there becomes a state in which the plurality of connection calls are established between the DTE 10 and the DTE 20, and the plurality-of-connection call setting process is ended. Thereafter, the transmission and receipt of the data are started in the two connections (a route on which the data are transferred in a sequence such as DTE 20→node B→node A→DTE 10) established between the DTE 10 and the DTE 20. Simultaneously with this, the transmission and the receipt of the data are also started in one remaining connection (a route on which the data are transferred in a sequence such as DTE 30→node C→node A→DTE 10) established between the DTE 10 and the DTE 30.

At this time, the DTE 20 and the DTE 30 have absolutely the same contents, and hence there are produced no disadvantages (e.g., a change in the contents of the services provided to the DTE 10, and so on) caused by the call-in DTE having changed to the DTE 30 from the DTE 23 in one remaining connection.

Note that the explanation has been given herein by exemplifying the case in which the plurality of connection calls are established between the DTE 10 and the DTE 20, however, the node B and the node C establish the plurality of connection calls by setting the connections between the node B and the DTE 20 if no connection can be set between the node C and the DTE 30 when establishing the plurality of connection calls between, e.g., the DTE 10 and the DTE 30.

<Effects of Embodiment 1>

According to the network system in the embodiment 1, on the occasion of establishing the plurality of connection calls using the three connections for transmitting the image data, the text data and the voice data between the DTE 10 and the DTE 20, if the connection for transmitting the voice data can not be set between the node B and the DTE 20 because of a deficiency in terms of the bandwidths (if unable to satisfy QOS required of the connection for transmitting the voice data), the node B establishes the connections relative to the image data and the text data between the DTE 20 and the node B itself, and makes the node C establish the connection concerning the voice data between the DTE 30 and the node C itself.

The three connections are thereby established between the DTE 10 and the DTE 20, and between the DTE 10 and the DTE 30. It is therefore feasible to avoid the plurality of connection calls from be disconnected due to such a case that any one of the three connections is incapable of ensuring the bandwidth required (unable to satisfy the QOS required). Particularly if incapable of setting all the connections belonging to the plurality of connection calls between the call-in DTE and the call-in DTE accommodation node, the plurality of connection calls can be established.

Further, the ID "0001" indicating that three connections are of the same call is added to the messages between the node A and the node B, between the node B and the node C, and between the node C and the node A; and in the nodes A, B and C, the respective connections are set (the call management table 18 is updated) in accordance with the ID "0001". Hence, even when the node A receives each of the completion-of-connection messages relative to the three connections separately from the node B and the node C, it never happens that the node A treats these completion-of-connection messages as being based on separate calls.

Further, on the occasion of setting the plurality of connection calls between the node B and the DTE 20, there is implemented the setting of the connection possible of ensuring the bandwidths among the connections belonging to the plurality of connection calls. Therefore, the usable bandwidths between the node B and the DTE 20 can be effectively utilized.

Moreover, the process of establishing the three connections between the DTE 10 and the DTE 20 and between the DTE 10 and the DTE 30, is executed by only the nodes A, B and C. Hence, there is no necessity for using the DTEs having a special construction by way of the DTEs 10, 20 and 30, and for adding a special construction to the DTE 10 etc. Accordingly, the hitherto existing DTEs can be used as the DTE 10 and DTE 20 or the DTE 30.

Note that the embodiment 1 has dealt with the case of establishing the plurality of connection calls between the DTE 10 and the DTE 20, however, the nodes B and C implement the above-described processes even if there must be the singular number of connection.

Namely, the node B, if unable to set the connection between the node B and the DTE 20 on the occasion of establishing the call between, e.g., the DTE 10 and the DTE 20, transmits the substitute connection set request message to the node C on the basis of the storage contents in the connection transfer destination table 19. The node C, upon-receiving the substitute connection set request message, sets the connection between the node C and the DTE 30, and establishes the call between the DTE 10 and the DTE 30.

Therefore, it is possible to establish larger numbers connections and of calls than by the prior art. In this case also, the DTE 20 and the DTE 30 have the same contents, and hence the DTE 10 is capable of receiving from the DTE 30 the data which must have received from the DTE 20.

Note that the nodes A, B and C execute the processes shown in any of FIGS. 4, 5 and 6 in accordance with the messages received from the DTEs accommodated in the same nodes themselves or from other nodes. Accordingly, on the occasion of establishing the plurality of connection calls between the DTE 10 and the DTE 20, the network system in the embodiment 1 can be constructed to establish the plurality of connection calls by setting all the connections between the node A and the node C and between the node C and the DTE 30 if any one of the connections can not be set between the node A and the node B.

In this case, a contrivance is that the data about the DTE 30 are stored as those of the transfer destination DTE in the connection transfer destination table 19 of the node A, and the node A confirms the values of the usable bandwidths between the node C and the node A itself, and transmits to the node C the connection request message with a purport of setting the plurality of connection calls if capable of bandwidths of all the connections.

[Embodiment 2]

Next, an embodiment of the present invention will be discussed.

<Construction of Network System>

Figure 29:
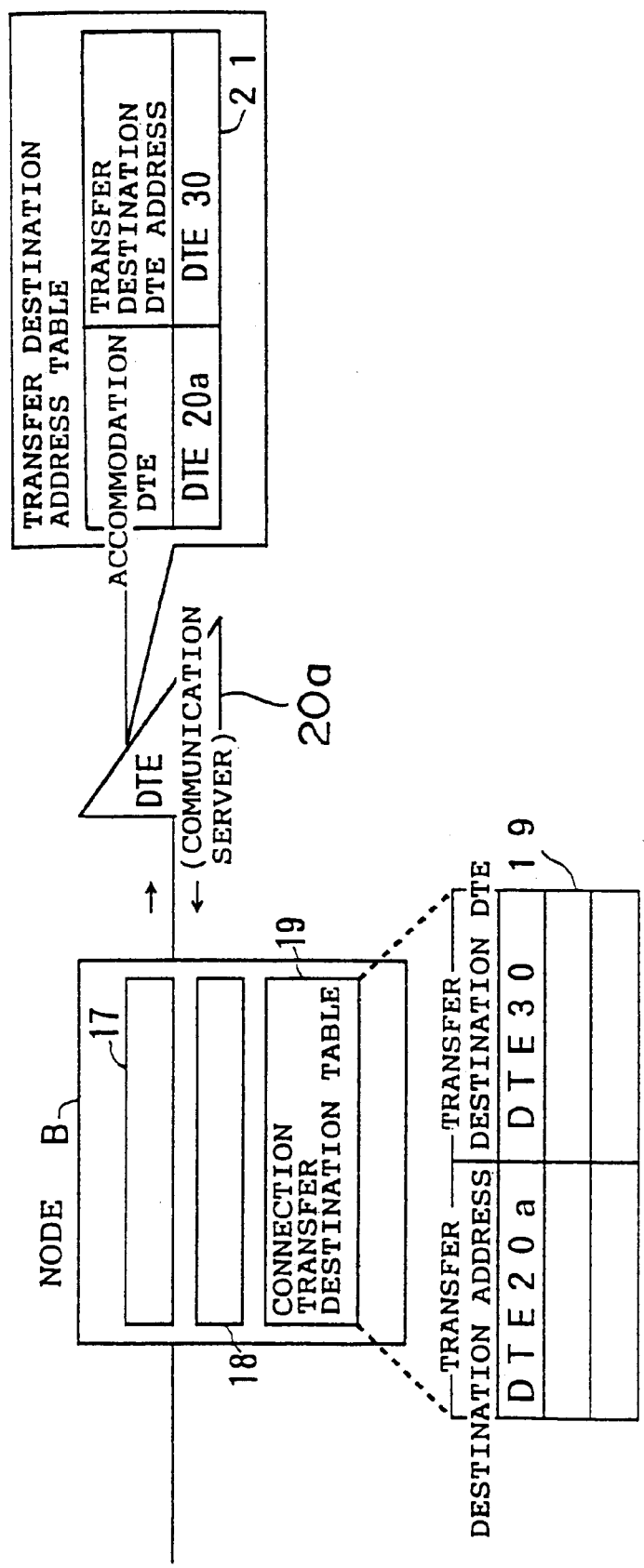
FIG. 29 is a block diagram showing the network system in an embodiment 2.

FIG. 29 is an explanatory diagram showing the network system in accordance with the embodiment 2. The network system in the embodiment 2 is constructed substantially the same as the network system in the embodiment 1. Therefore, the explanations of the common points are omitted, and only different points will be described.

Referring to FIG. 29, in the network system in the embodiment 2, a DTE 20a replacing the DTE 20 in the network system in the embodiment 1 is connected to the node B. This DTE 20a has substantially the same construction excluding such a point that an unillustrated memory provided therein retains a transfer destination address table 21. Then, the DTE 20a and the DTE 30 defined as communication servers have absolutely the same contents.

The transfer destination address table 21 is stored with data about the DTE (an accommodated DTE) accommodated in the node B, and with data about a transfer destination DTE address. Herein, data about the DTE 20a are stored as data bout the accommodated DTE. Further, data about the DTE 30 are stored therein as data bout the transfer destination DTE address. The data bout this transfer destination DTE address is transferred to the node B, and recorded (overwritten) on the connection transfer destination table 19 of the node B.

<Processes in Network System>

Figure 30:
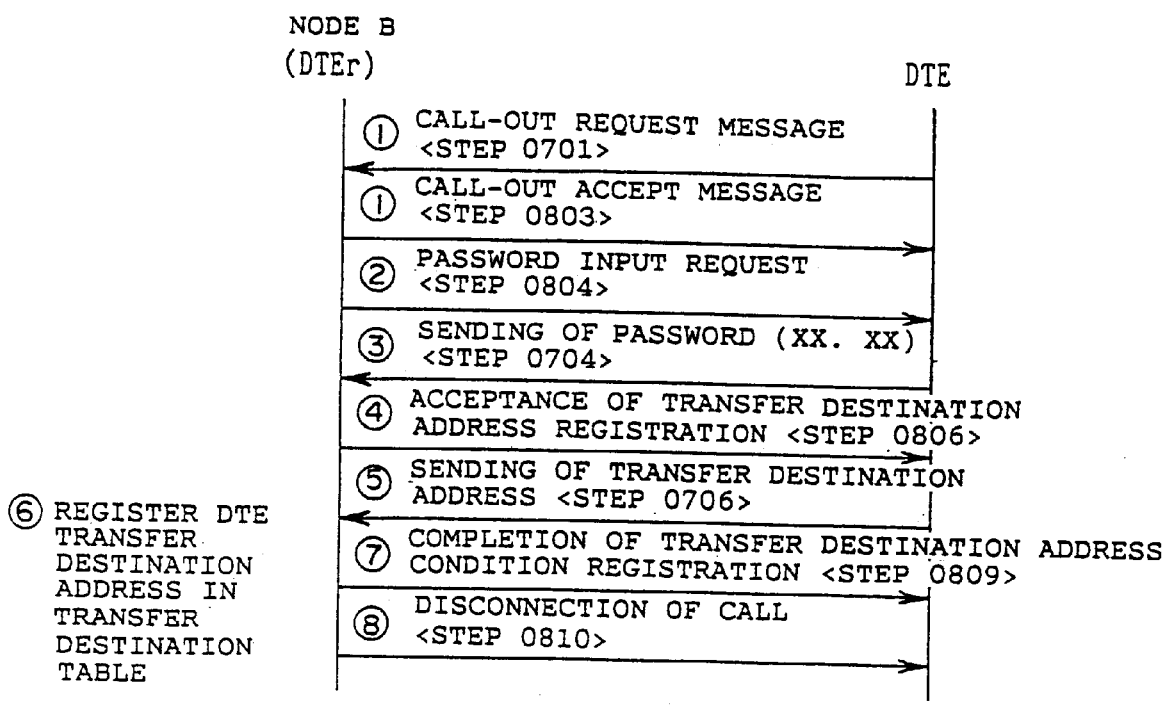
FIG. 30 is a sequence diagram showing a transfer destination address registering process.
Figure 31:
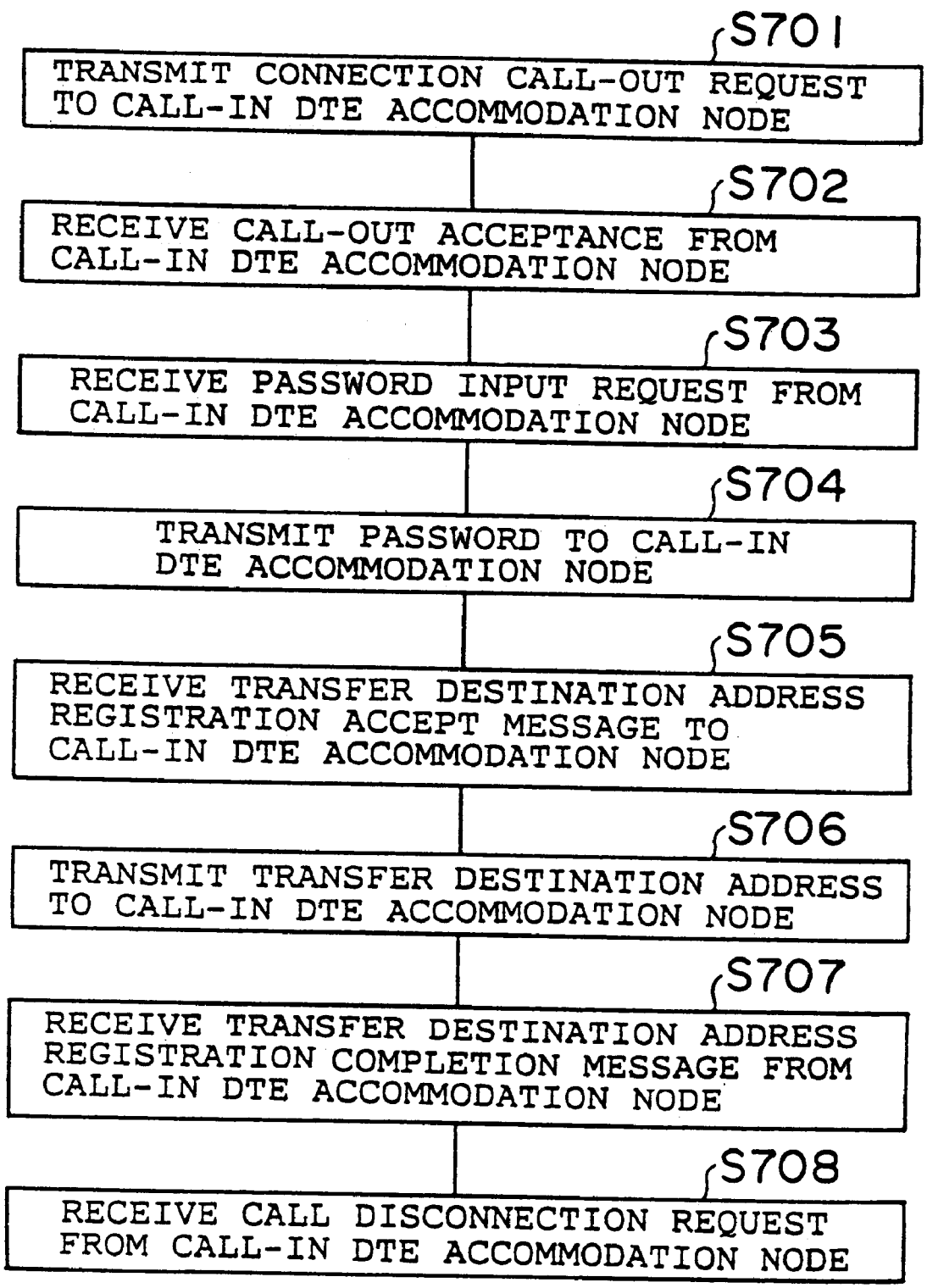
FIG. 31 is a flowchart showing a process by the call-in DTE in the embodiment 2.
Figure 32:
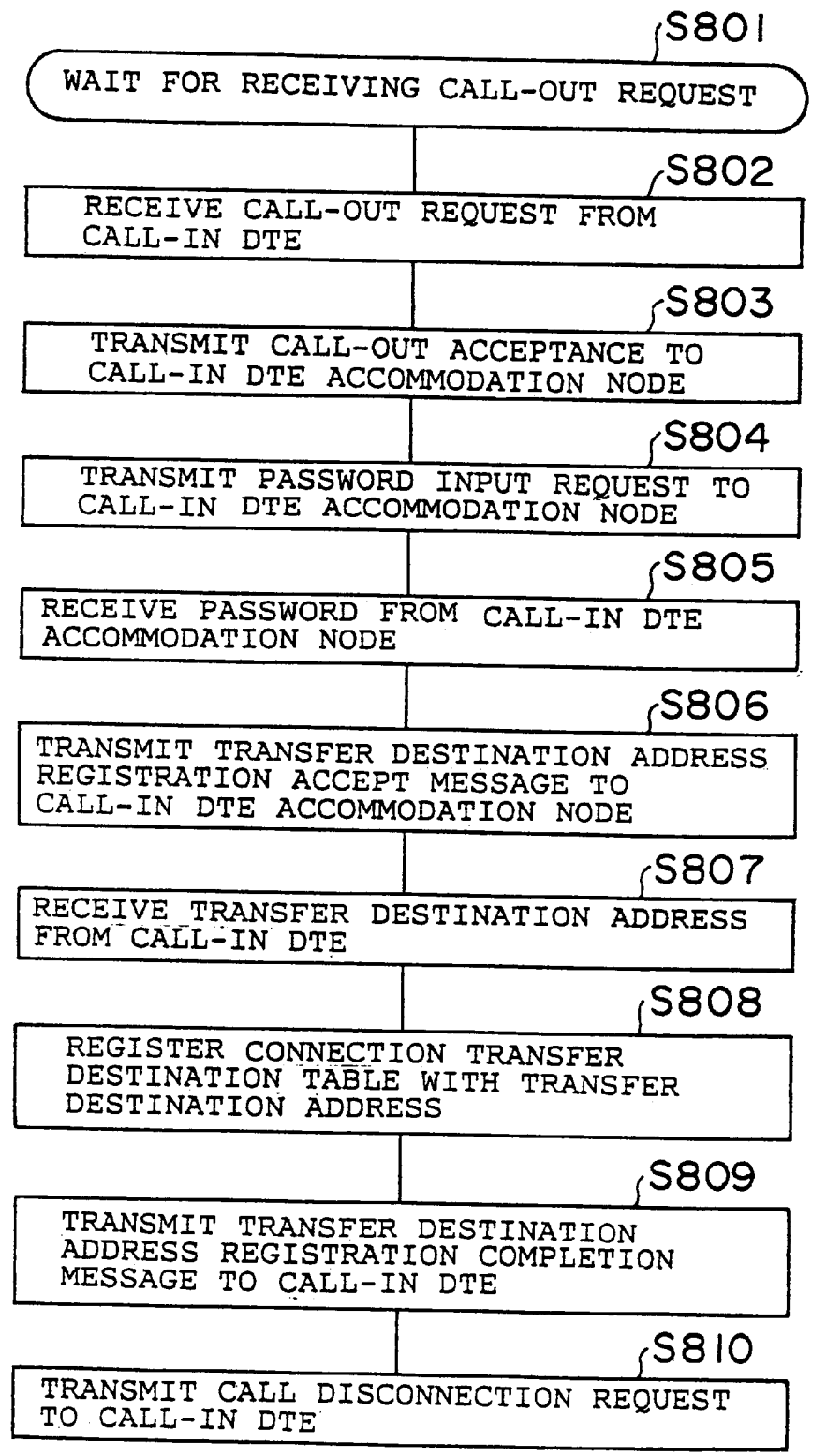
FIG. 32 is a flowchart showing a process by the call-in DTE accommodation node in the embodiment 2.

Next, processes in the network system in the embodiment 2 will be explained. FIG. 30 is a sequence diagram showing a process (hereinafter referred to as a "transfer destination address registering process") when updating storage contents in the connection transfer destination table 19 of the node B. FIG. 31 is a flowchart showing a process by the DTE 20a in the transfer destination address registering process. FIG. 32 is a flowchart showing a process by the node B in the transfer destination address registering process.

Upon a start of the transfer destination address registering process, as illustrated in FIG. 31, the DTE 20a transmits to the node b a call-out request message containing "DTEr" defined as a DTE address (in which the node B is imaginarily conceived as a DTE) for a transfer destination address registration (S701). Thereafter, the DTE 20a comes into a standby status for a call-out accept message.

As shown in FIG. 32, when the call-out request message transmitted from the DTE 20a is received by the node B being in a status of waiting for receiving the message (S801, S802), the node B transmits the call-out accept message to the DTE 20a (S803). Subsequently, the node B transmits a password input request message to the DTE 20a. Thereafter, the node B stands by for receiving a password.

Referring back to FIG. 31, the DTE 20a, when receiving the call-out accept message from the node B (S702) and subsequently receiving the password input request message (S703), a password (XX. XX) stored in an unillustrated memory of the node B is transmitted to the node B (S704). Thereafter, the DTE 20a stands by for a transfer destination address registration accept message.

Referring back to FIG. 32, when the node B receives the password from the DTE 20a (S805), the transfer destination address registration accept message is transmitted to the DTE 20a (S806). Thereafter, the node B stands by for the address data from the DTE 20a.

Referring again back to FIG. 31, when the DTE 20a receives the transfer destination address registration accept message (S705), data (an address of the DTE 30) about the transfer destination DTE address is read from the transfer destination address table 21, and this piece of address data about the DTE 30 is transmitted to the node B (S706). Thereafter, the DTE 20*a* stands by for a transfer address registration completion message and a call disconnection request message.

Referring again back to FIG. 32, when the node B receives the address data of the DTE 30 (S807), this piece of address data of the DTE 30 is stored (overwritten) as a transfer destination address of the DTE 20*a* in the connection transfer destination table 19 of the node B (S808). Then, the transfer destination address registration completion message is transmitted to the DTE 20*a* (S809), and subsequently the call disconnection request message is transmitted to the DTE 20*a* (S810), The processes by the node B are ended up with finishing the process in this step S810.

Referring again back to FIG. 31, the DTE 20*a*, when receiving the transfer destination address registration completion message from the node B (S707) and subsequently the call disconnection request message (S708), disconnects the call between the node B and the DTE 20*a* itself, thus finishing the transfer destination address registering process.

Note that a condition for starting the above-described transfer destination address registering process can be properly set. For example, there may be constructed to start the same process by inputting a start-of-process command from the outside of the DTE 20*a*, or just when an unillustrated timer incorporated into the DTE 20*a* counts up a predetermined time. The effects in the embodiment 2 are substantially the same as those in the embodiment 1.

[Embodiment 3]

Next, an embodiment 3 of the present invention will be discussed.

<Construction of Network System>

The network system in the embodiment 3 has substantially the same construction as the network system in the embodiment 2. A difference therebetween is, however that the nodes A, B and C do not have the connection transfer destination table 19.

<Processes in Network System>

Processing (a plurality-of-connection call setting process) in the network system in accordance with an embodiment 3 will be explained. The plurality-of-connection call setting process in the embodiment 3 is substantially the same as the plurality-of-connection call setting process in the embodiment 1. Specifically, a difference is only the way in which to execute a transferring/receiving process between the node B and the DTE 20*a*, and others except for this are absolutely the same. Therefore, the explanations of the common points are omitted, and only different points will be described.

Figure 33:
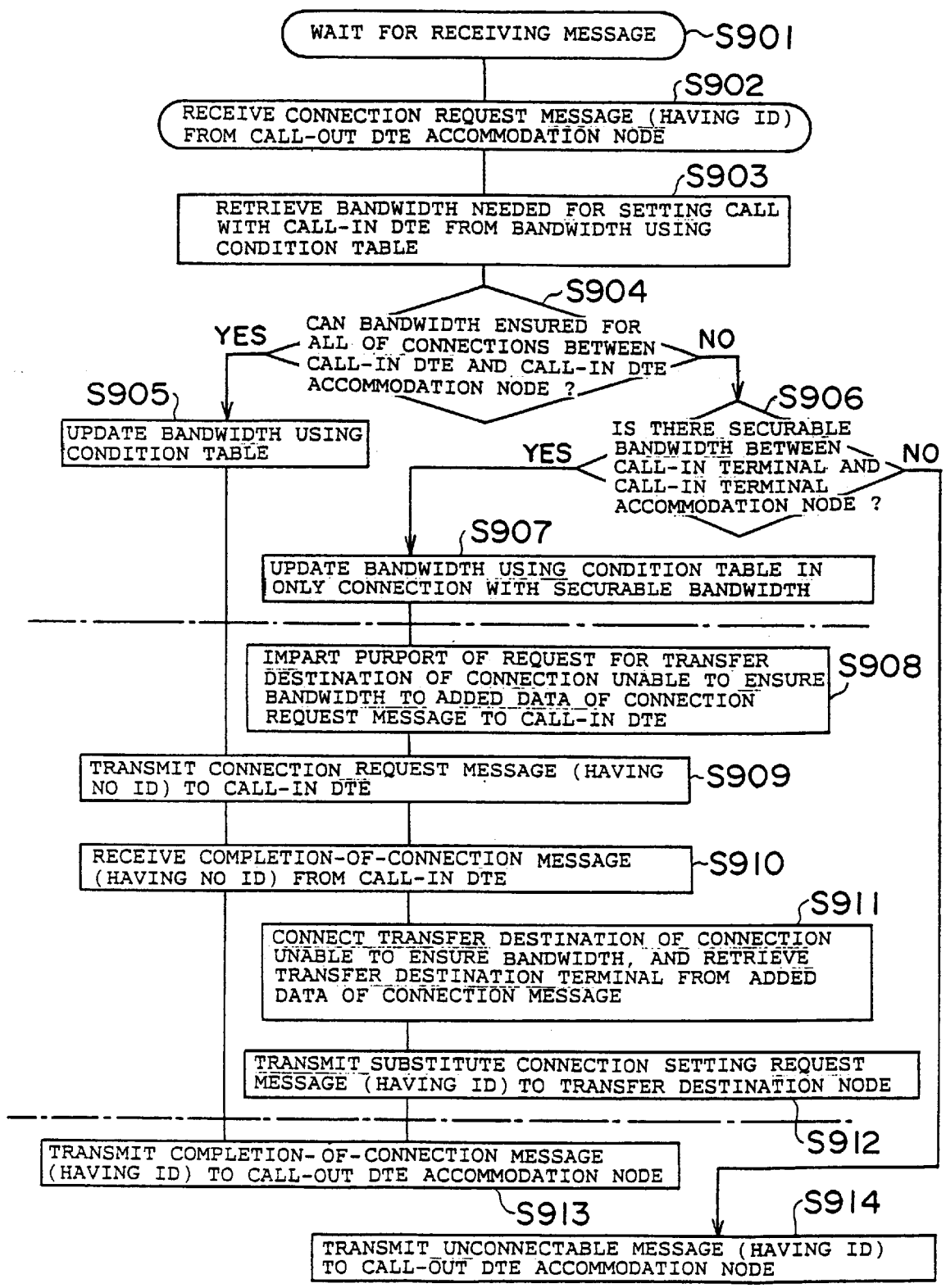
FIG. 33 is a flowchart showing a process by the call-in DTE accommodation node in an embodiment 3.
Figure 34:
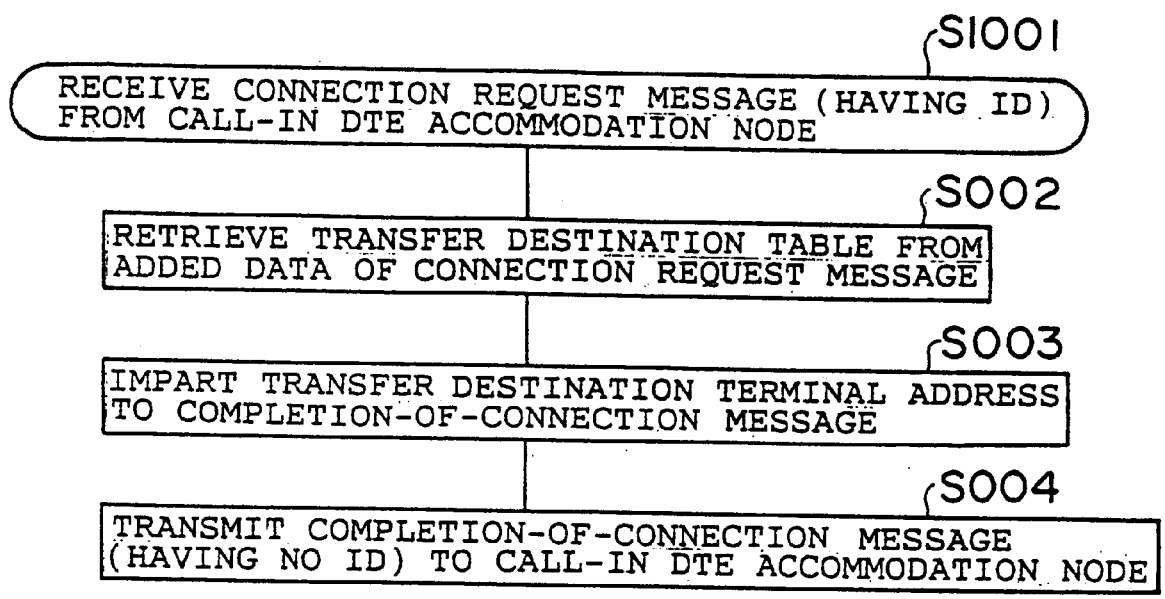
FIG. 34 is a flowchart showing a process by the call-in DTE in the embodiment 3.
Figure 36:
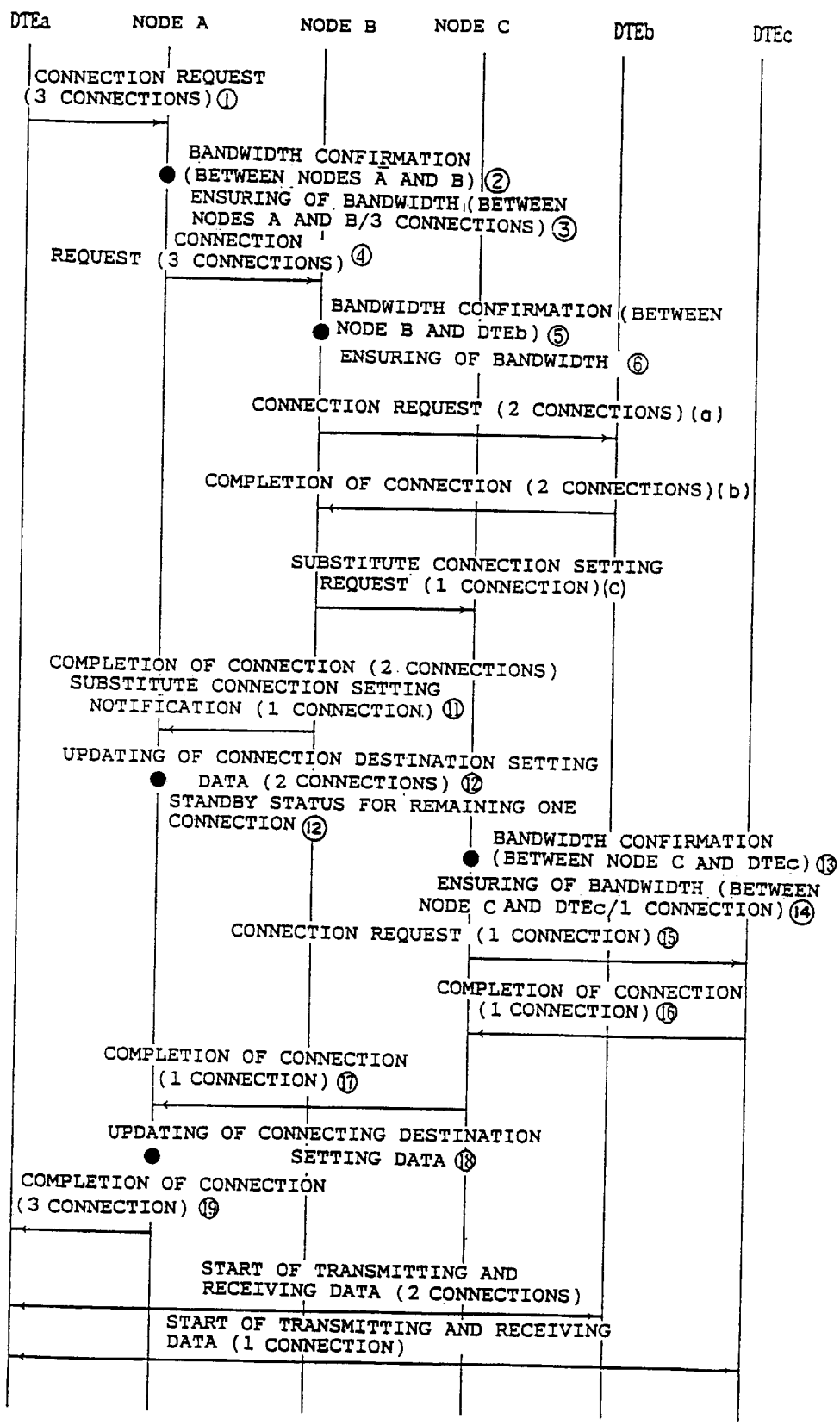
FIG. 36 is a sequence diagram showing the plurality-of-connection call setting process in the embodiment 3.
Figure 37:
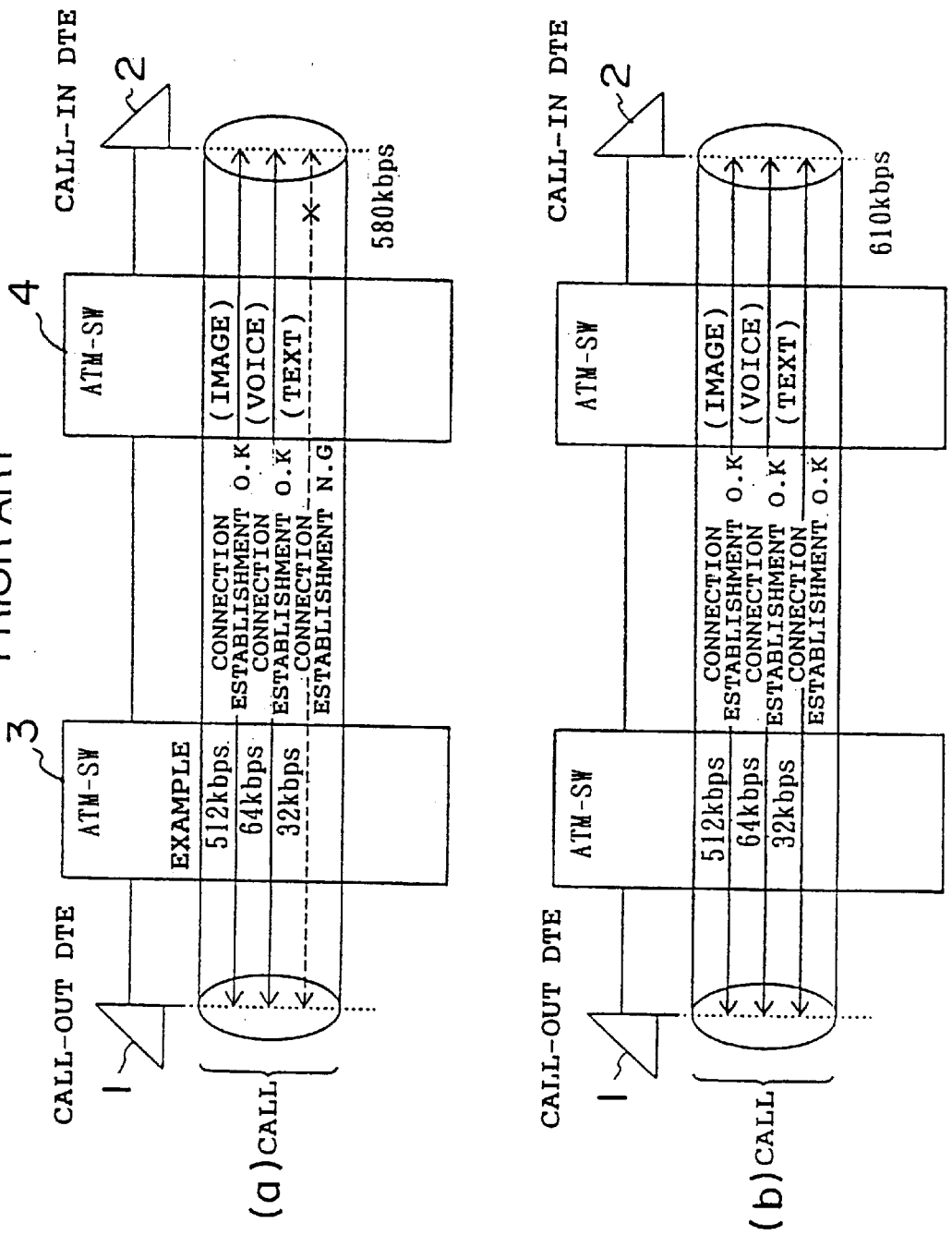
FIG. 37 is an explanatory diagram showing a plurality-of-connection call in the prior art.
Figure 38:
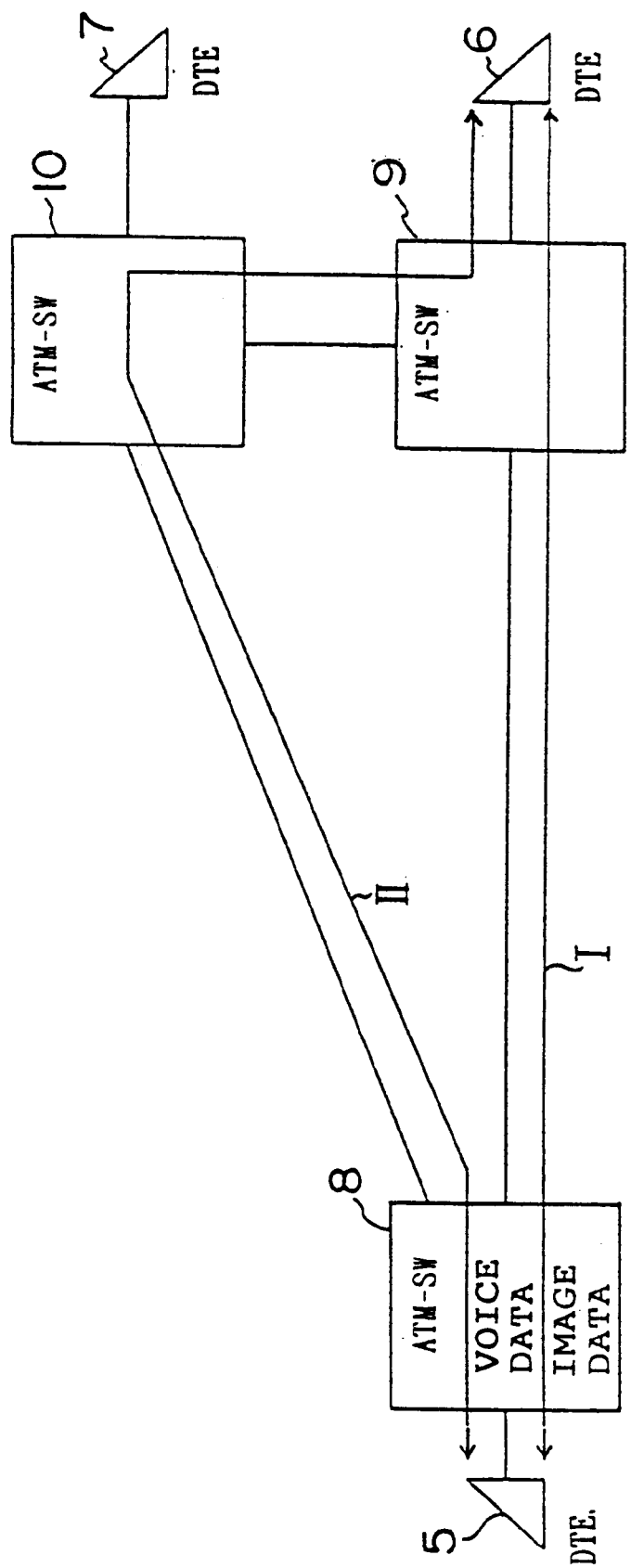
FIG. 38 is a diagram illustrating a networks system in the prior art.

FIG. 33 is a flowchart showing the plurality-of-connection call setting process by the node B in the embodiment 3. FIG. 34 is a flowchart showing a process by the DTE 20*a*. FIG. 35 is an explanatory diagram showing a message transferred and received between the node B and the DTE 20*a*. FIG. 36 is a sequence diagram showing the plurality-of-connection call setting process in the embodiment 3.

The node A receives the connection request message from the DTE 10 defined as a call-out DTE (S101; see FIG. 4). then, the node A secures bandwidths required for the respective connections between the node B and the node A itself, and thereafter transmits the connection request message to the node B (S106), at which time the process by the node B starts.

Referring to FIG. 33, processes in S901–S907 are the same as those in S201–S207 (see FIG. 5), and hence explanations thereof are omitted.

Then, when the processing proceeds to S908, a purport of requesting an address (a substitute DTE address) of the transfer destination DTE of the connection incapable of ensuring the bandwidth, is added as a piece of added data of the connection request message with respect to the DTE 20*a* (see FIG. 35 (*a*)). Thereafter, the connection request message is transmitted to the DTE 20*a* (S909).

As shown in FIG. 34, the DTE 20*a*, when receiving the connection request message (S101), retrieves a transfer destination address table 21 (see FIG. 29) on the basis of the added data of the connection request message, and reads an address of the DTE 30 which is stored by way of a transfer destination DTE address (a substitute DTE address) with respect to the DTE 20*a* (S1002).

Subsequently, the DTE 20*a* executes the process of setting the relevant connection in accordance with the connection request message, and, when this process is finished, generates the completion-of-connection message (see FIG. 35 (*b*)). At this time, the DTE 20*a* imparts the address of the DTE 30 which has been read as the added data of the completion-of-connection message in S1002 (S1003). Then, the DTE 20*a* transmits the completion-of-connection message to the node B (S1004).

As shown in FIG. 33, when the node B receives the completion-of-connection message transmitted from the DTE 20*a* (S910), the transfer destination DTE (becoming a call-in DTE replacing the DTE 20*a*) of the connection is retrieved based on the added data of the completion-of-connection message (S911). Herein, since the address of the DTE 30 is imparted as the substitute DTE address to the added data, the node B recognizes that the transfer destination DTE of the DTE 20*a* is the DTE 30.

Then, the substitute connection setting-request message (see FIG. 35(*c*)) with the DTE 30 serving as a transmitting destination, is generated and transmitted to the DTE 30. Note that the processes in S913 and S914 are respectively the same as those in S212 and S213 shown in FIG. 5, and hence the explanations thereof are omitted. Further, the processes by the node B, the node C, the DTE 30, the node A and the DTE 10 after finishing the process in S912 are the same as those in the embodiment 1, and therefore their explanations are omitted. Finally, as in the embodiment 1, there are established the plurality of connection calls for which the respective connections have been established between the DTE 10 and the DTE 20, and between the DTE 10 and the DTE 30.

The effects in the embodiment 3 are substantially the same as the effects in the embodiment 1 and the embodiment 2. As a matter of course, there is such as advantage that the node B may not have the connection transfer destination table 19. The DTE 20*a* is, however, required to have a transfer destination address table.

Note that the ATM network has been described by way of a network in the embodiments 1, 2 and 3, however, the network according to the present invention may be a frame relay network or a packet switching network. For instance, the present invention is embodied by exemplifying the frame relay network, in which case the nodes A, B and C are constructed by use of frame relay switching units. Moreover, the call management table 18 possessed by each frame relay switching unit is stored with a DLCI (a data link connection identifier) in place of the VPI and the VCI by way of the call-out data and the call-in data.

It is apparent that, in this invention, a wide range of different working modes can be formed based on the invention without deviating from the spirit and scope of the invention. This invention is not restricted by its specific working modes except being limited by the appended claims.

What is claimed is:

1. A network system comprising:

a first node accommodating a first terminal equipment;

a second node accommodating a second terminal equipment; and a third node accommodating a third terminal equipment, wherein:

said first node receives from said first terminal equipment a call setting request for requesting a first connection and a second connection to be set between said first terminal equipment and said second terminal equipment;

said first node transmits to said second node a connection request message for requesting said first and second connections to be set between said first terminal equipment and said second terminal equipment;

said second node, when receiving the connection request message, judges whether or not said first and second connections can be set between said second node and said second terminal equipment, and if, between said second node and said second terminal equipment, either one of said first and second connections can be set but other connection of said first and second connections cannot be set, said second node only sets the one connection between said second node and said second terminal equipment;

said second node transmits to said third node a substitute connection setting message for setting the other connection between said first terminal equipment and third terminal equipment;

said second node sets the one connection between said second node and said first node;

said third node receives the substitute connection setting message and sets the other connection between said third node and said third terminal equipment according to the substitute connection setting message;

the other connection is set between said third node and said first node; and said first node sets said first and second connections between said first node and said first terminal equipment.

2. The network system according to claim 1, wherein said second node detects a usable bandwidth value between said second node and said second terminal equipment, compares the detected bandwidth value with a bandwidth value required for setting said first and second connections between said second node and said second terminal equipment, and thereby judges whether or not said first and second connections can be set.

3. The network system according to claim 2, wherein said second node, if the usable bandwidth value between said second node and said second terminal equipment is under the bandwidth value required for setting said first and second connections between said second node and said second terminal equipment, selects either one of said first and second connections in which a securable bandwidth value is requested, as the one connection.

4. The network system according to claim 1, wherein said second node, if said first and second connections cannot be set between said first terminal equipment as a call-out terminal and said second terminal equipment as a call-in terminal, has information about said third terminal equipment which becomes a call-in terminal instead of said second terminal equipment, transmits to said third node the substitute setting message containing the information about said third terminal equipment.

5. The network system according to claim 4, wherein the information about said third terminal equipment is registered at said second node by said second terminal equipment.

6. The network system according to claim 4, wherein said second node, if said first and second connections cannot be set between said first terminal equipment as a call-out terminal and said second terminal equipment as a call-in terminal, obtains the information about said third terminal equipment.

7. The network system according to claim 1, wherein said first node, when transmitting the connection request message, adds to the connection request message an identifier for indicating that said first and second connections belong to the same call;

said second node adds said identifier to the substitute setting message and transmits the substitute setting message to said third node;

said second node, when the one connection is set between said second node and said second terminal equipment and the one connection is set between said second node and said first node, adds said identifier to a first connection completion message for indicating a setting completion thereof and transmits the connection completion message to said first node; and wherein said third node, when the other connection is set between said third node and said third terminal equipment and the other connection is set between said third node and said first node, adds said identifier to a second connection completion message for indicating the setting completion thereof and transmits the connection completion message to said first node; and said first node receives the identifiers which are contained in the first and second connection completion messages received from said second node and said third node, and thereby recognizes that each of the first and second connection completion messages correspond to the first and second connections which belong to the same call.

8. A switching unit, which accommodates a call-in terminal equipment, and is connected to a first other switching unit accommodating a call-out terminal equipment, and is connected to a second other switching unit accommodating a substitute terminal equipment, said switching unit comprising:

a judging unit which judges, when receiving a connection request message for setting a first connection and a second connection belonging to one call between said call-out terminal and said call-in terminal from said first other switching unit, whether or not the first and second connections can be set between said call-in terminal equipment and said switching unit;

a connection setting unit, which in case if, between said call-in terminal equipment and said switching unit, either one of the first and second connections can be set but other connection cannot be set, sets the one connection between said call-in terminal equipment and said switching unit and sets the one connection between said switching unit and said first other switching unit; and a substitute connection setting unit, which in case if, between said call-in terminal equipment and said switching unit, either one of the first and second connections can be set but other connection cannot be set, transmits a substitute setting message requesting of said second other switching unit that said second other switching unit sets the other connection between said second other switching unit and said substitute terminal equipment and sets the other connection between said second other switching unit and said first other switching unit, to said second other switching unit.

9. The switching unit according to claim 8, and further comprising:
 a substitute terminal storing unit storing information about said substitute terminal equipment, and
 wherein said substitute connection setting unit transmits to said second other switching unit the substitute setting message in accordance with said information.

10. The switching unit according to claim 9, wherein said substitute connection setting unit obtains information from said call-in terminal equipment.

* * * * *